United States Patent
Song et al.

(10) Patent No.: US 10,862,547 B2
(45) Date of Patent: Dec. 8, 2020

(54) MIMO-OFDM-BASED COOPERATIVE COMMUNICATION SYSTEM FOR INTERFERENCE MITIGATION BETWEEN CELLS IN HETEROGENEOUS NETWORK AND COOPERATIVE COMMUNICATION METHOD USING THE SAME

(71) Applicant: INDUSTRY-ACADEMIA COOPERATION GROUP OF SEJONG UNIVERSITY, Seoul (KR)

(72) Inventors: Hyoung-Kyu Song, Seongnam-si (KR); Min-Jae Paek, Seoul (KR); Won-Chang Kim, Seoul (KR)

(73) Assignee: INDUSTRY-ACADEMIA COOPERATION GROUP OF SEJONG UNIVERSITY, Seoul (KR)

(*) Notice: Subject to any disclaimer, the term of this patent is extended or adjusted under 35 U.S.C. 154(b) by 0 days.

(21) Appl. No.: 16/281,091

(22) Filed: Feb. 21, 2019

(65) Prior Publication Data
US 2020/0177241 A1  Jun. 4, 2020

(30) Foreign Application Priority Data
Nov. 30, 2018 (KR) .................. 10-2018-0152251

(51) Int. Cl.
| | | |
|---|---|---|
| *H04B 7/02* | (2018.01) | |
| *H04B 7/024* | (2017.01) | |
| *H04B 17/382* | (2015.01) | |
| *H04B 7/0417* | (2017.01) | |
| *H04B 7/0456* | (2017.01) | |
| *H04B 7/08* | (2006.01) | |

(52) U.S. Cl.
CPC ........... *H04B 7/024* (2013.01); *H04B 7/0417* (2013.01); *H04B 7/0478* (2013.01); *H04B 7/0854* (2013.01); *H04B 17/382* (2015.01)

(58) Field of Classification Search
CPC .... H04B 7/024; H04B 17/382; H04B 7/0417; H04B 7/0478; H04B 7/0854
USPC ........................................................ 375/262
See application file for complete search history.

(56) References Cited

U.S. PATENT DOCUMENTS

| | | | | |
|---|---|---|---|---|
| 2010/0085917 A1* | 4/2010 | Gorokhov | ............. | H04L 5/0023 370/328 |
| 2012/0287799 A1* | 11/2012 | Chen | ...................... | H04B 7/024 370/252 |
| 2013/0322392 A1* | 12/2013 | Abe | ...................... | H04W 48/12 370/329 |

(Continued)

FOREIGN PATENT DOCUMENTS

KR    10-2015-0064834 A    6/2015

*Primary Examiner* — Michael R Neff
(74) *Attorney, Agent, or Firm* — Revolution IP, PLLC

(57) ABSTRACT

Disclosed is a MIMO-OFDM-based intercellular cooperative communication system and a cooperative communication method using the system, the system and method using the system mitigate influence of an intercellular interference and to increase reliability of the mobile terminal located at an edge of a cell, using a CoMP scheme by which base stations cooperate in a HetNet system, a pre-coding scheme by which a channel coefficient of a desired signal increases and a channel coefficient of an interference signal is reduced, and a MIMO detection scheme with an excellent signal detection performance.

14 Claims, 12 Drawing Sheets

(56) References Cited

U.S. PATENT DOCUMENTS

2014/0307648 A1\* 10/2014 Nagata ................. H04W 16/32
370/329

\* cited by examiner

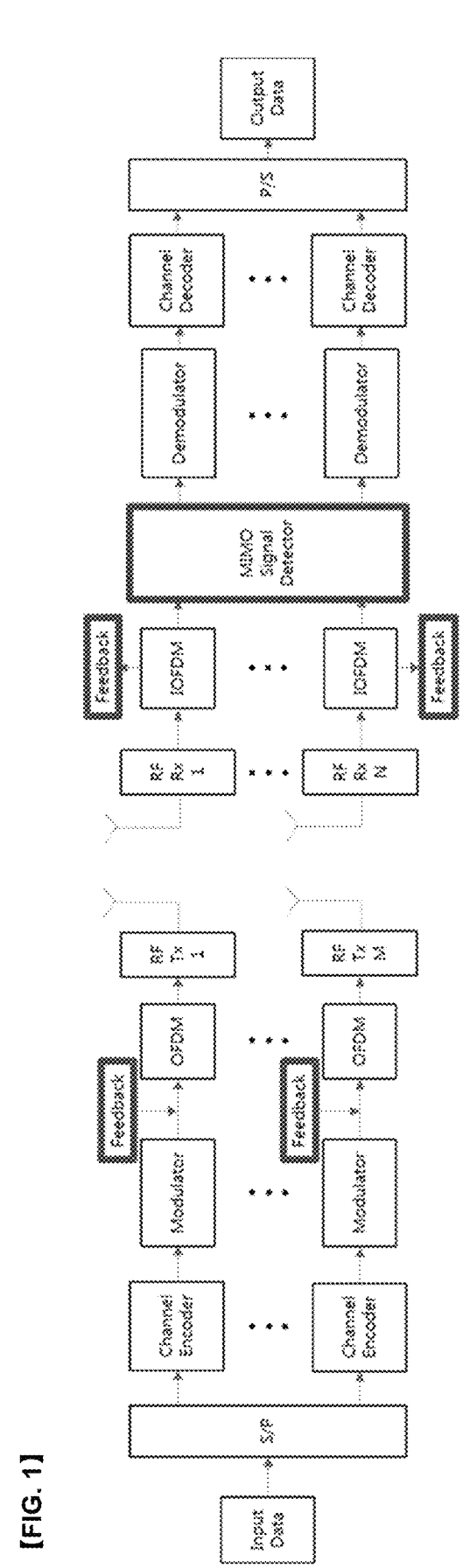
[FIG. 1]

[FIG. 2]
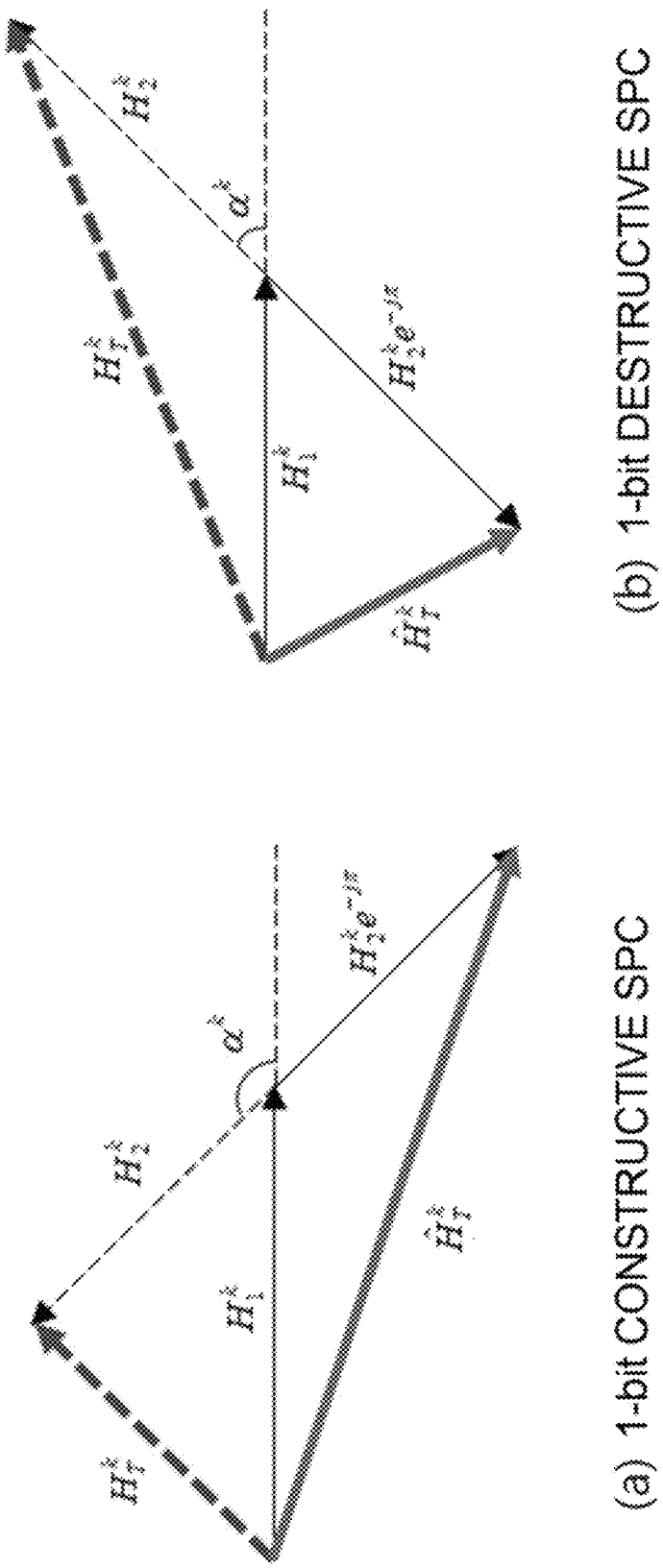
(a) 1-bit CONSTRUCTIVE SPC
(b) 1-bit DESTRUCTIVE SPC

[FIG. 3]
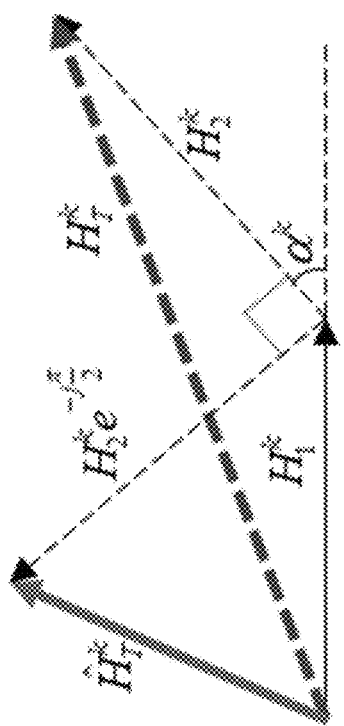
(a) 2-bit CONSTRUCTIVE SPC
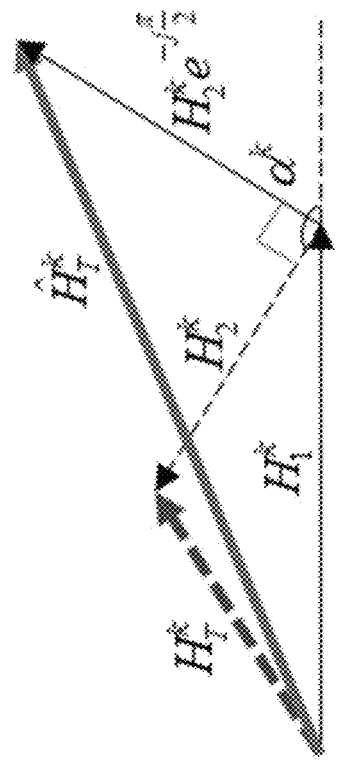
(b) 2-bit DESTRUCTIVE SPC

[FIG. 4]
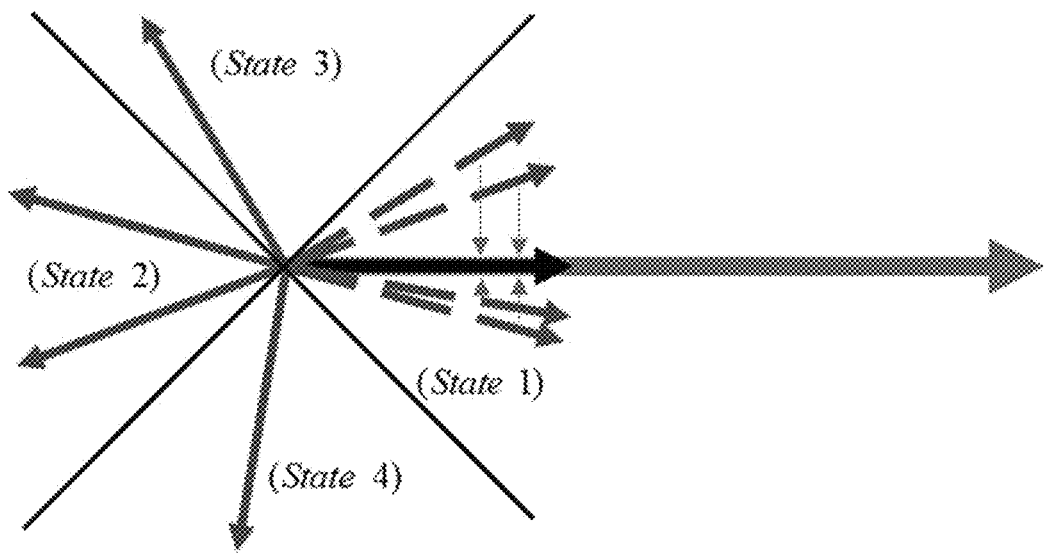
[FIG. 5]
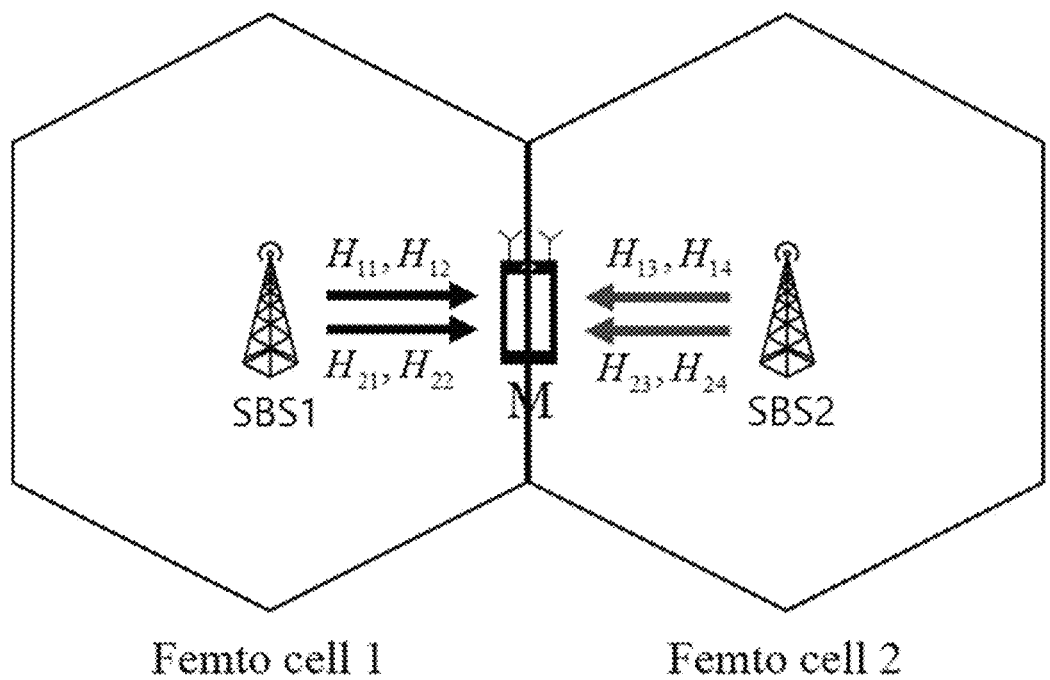

【FIG. 6】
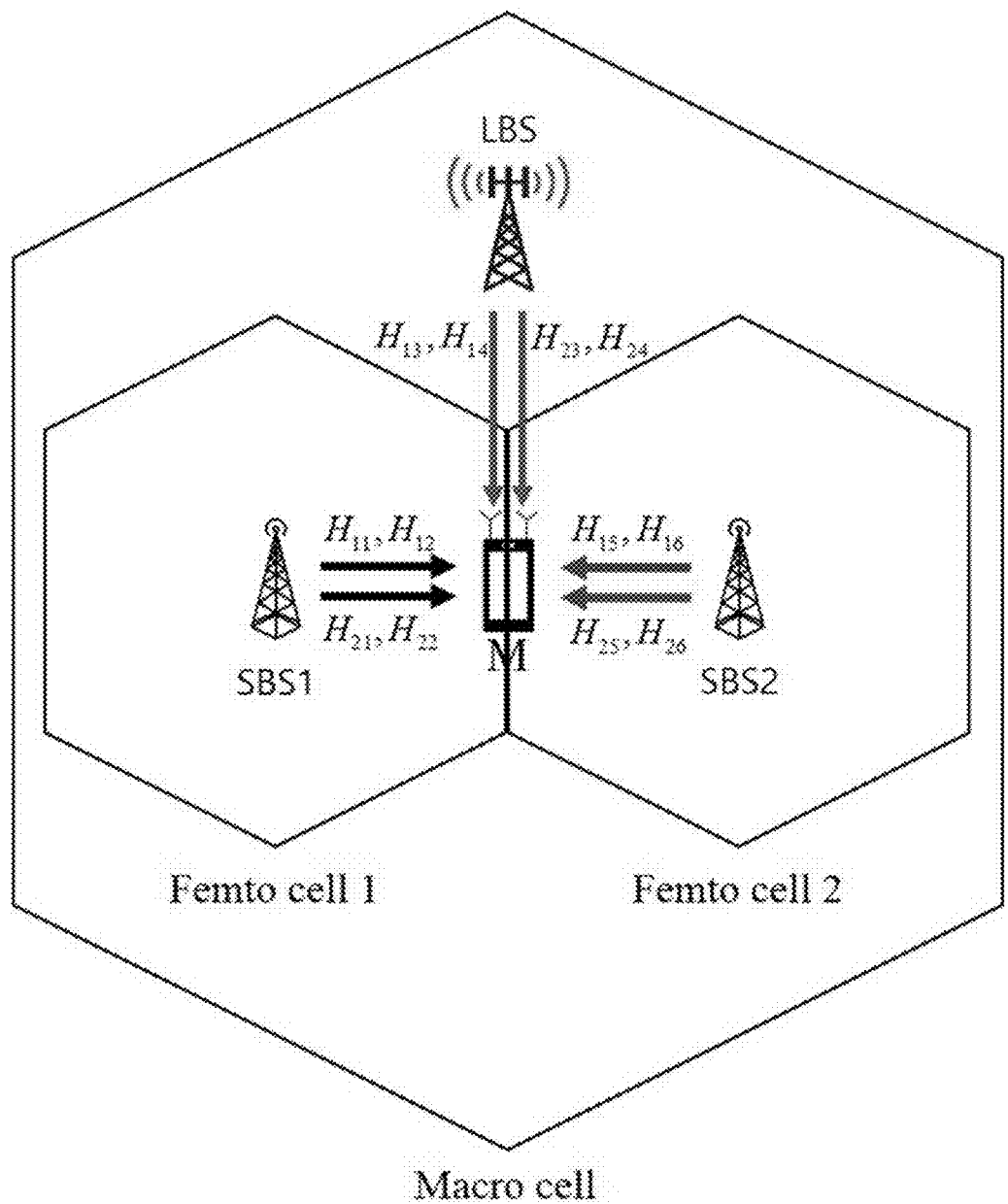

[FIG. 7]
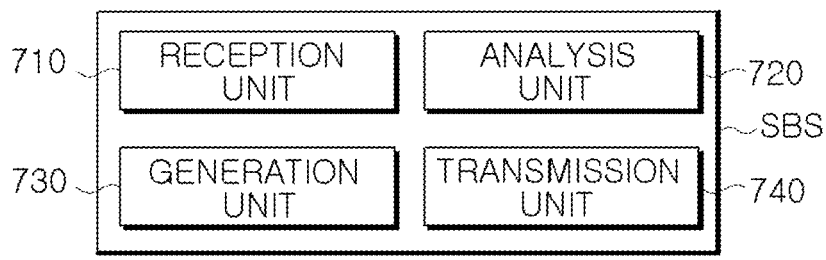
[FIG. 8]
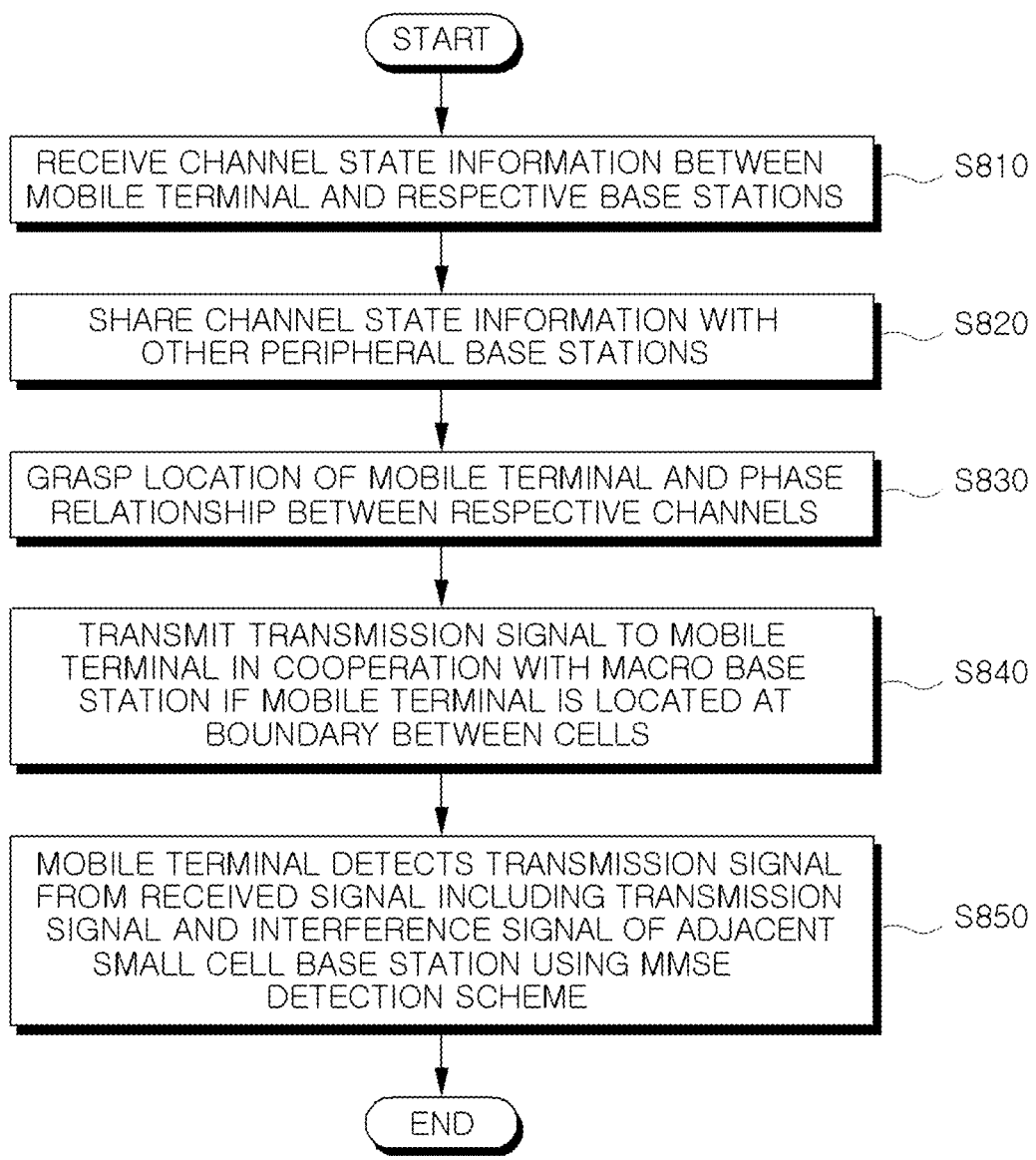

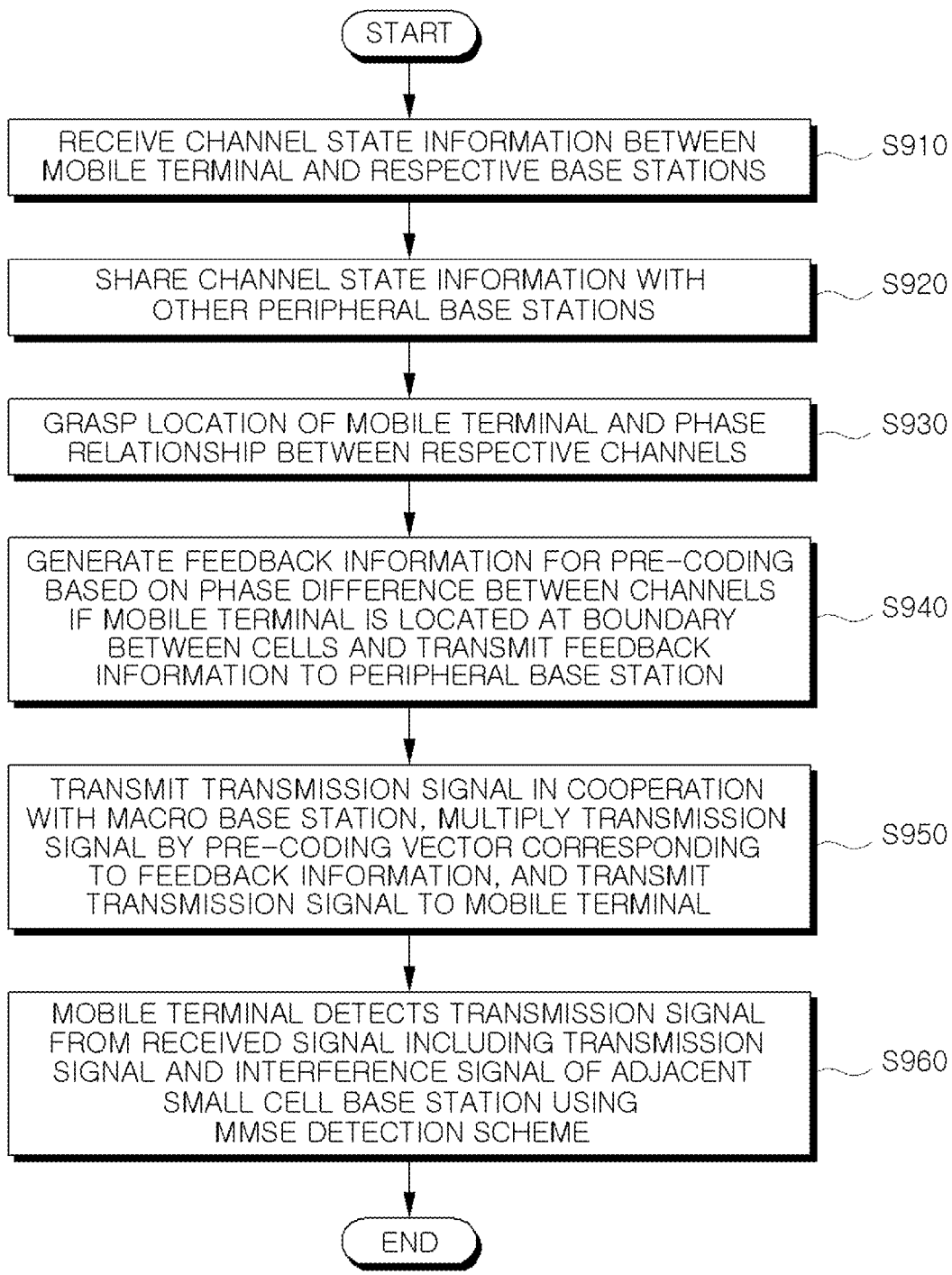

[FIG. 10]
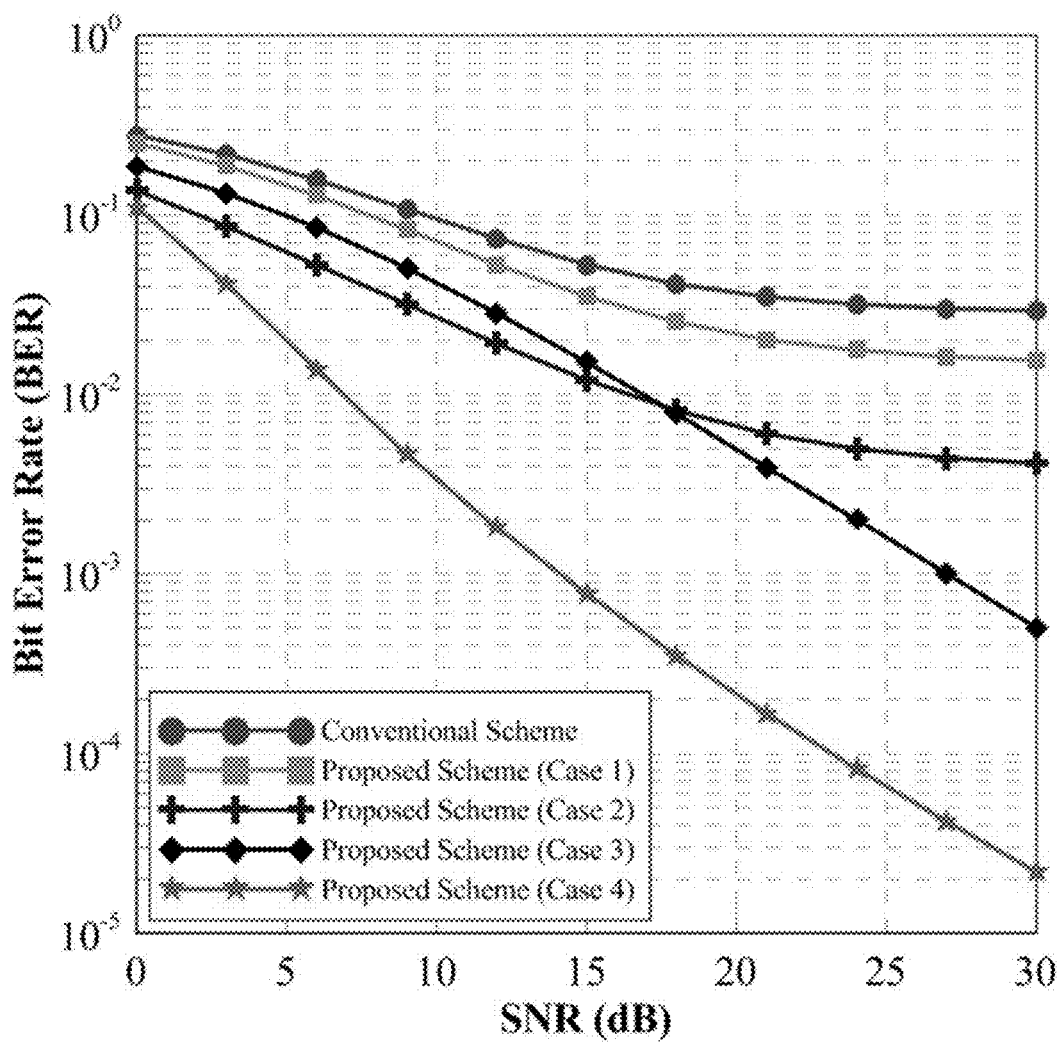

[FIG. 11]
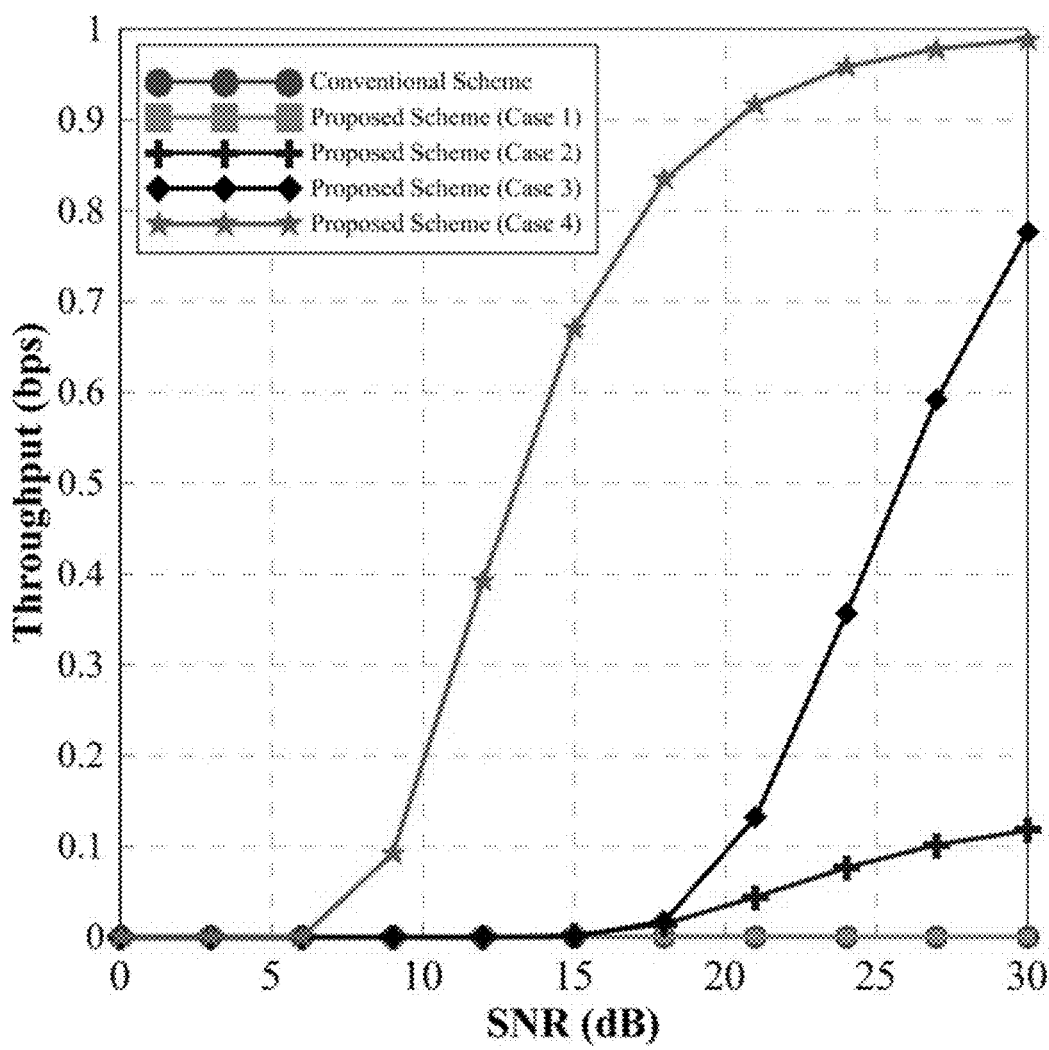

[FIG. 12]
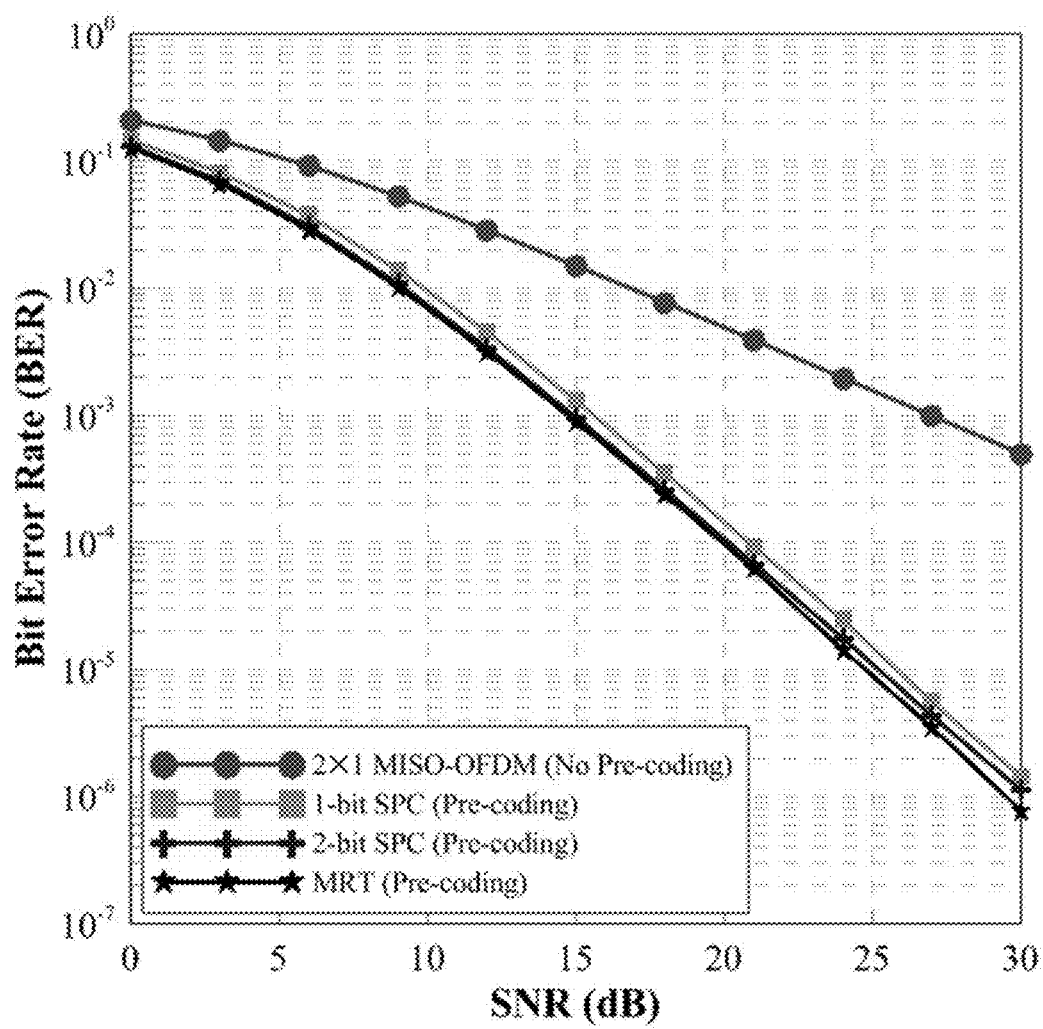

[FIG. 13]
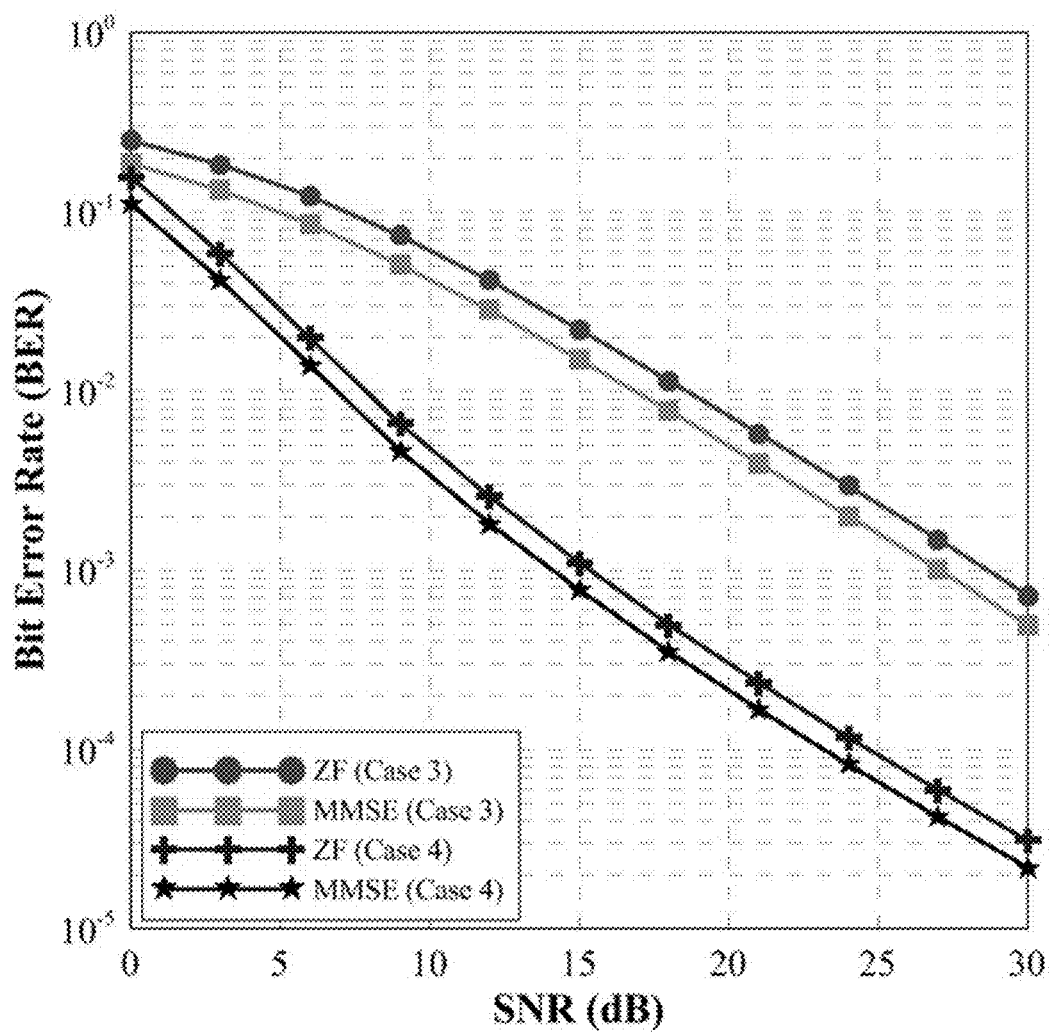

[FIG. 14]
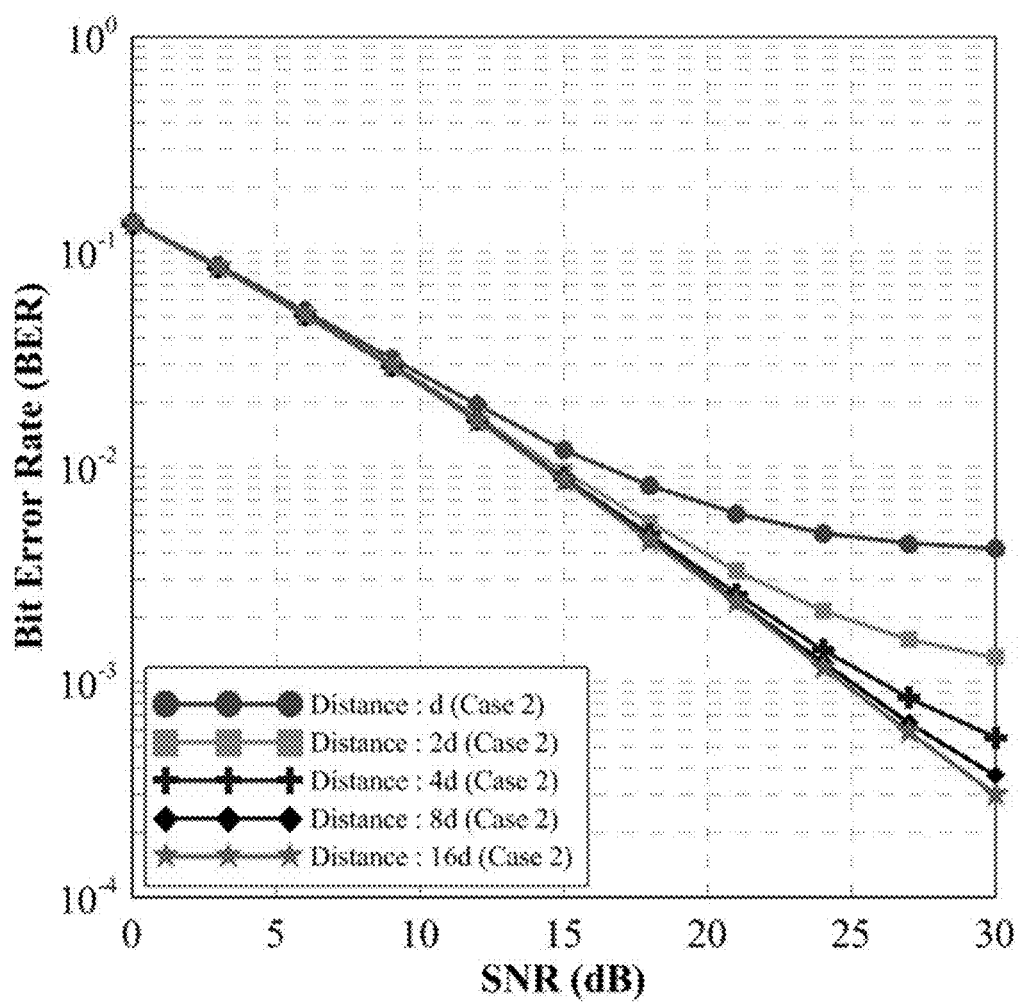

MIMO-OFDM-BASED COOPERATIVE COMMUNICATION SYSTEM FOR INTERFERENCE MITIGATION BETWEEN CELLS IN HETEROGENEOUS NETWORK AND COOPERATIVE COMMUNICATION METHOD USING THE SAME

TECHNICAL FIELD

The present invention relates to a MIMO-OFDM-based cooperative communication system in a heterogeneous network and a cooperative communication method using the system, and particularly, to an intercellular cooperative communication system that increases reliability of a mobile terminal by mitigating an interference problem between adjacent cells in a heterogeneous network and a cooperative communication method using the system.

BACKGROUND ART

Attenuation and distortion of a signal in a wireless communication environment is caused by multipath fading. This problem can be effectively solved by using multiple antennas, and a MIMO-OFDM scheme is one of the representative methods.

An OFDM scheme is robust against frequency selective fading due to the multipath fading and it is possible to obtain a high bandwidth efficiency. In addition, digital signal processing can be easily performed at transmission and reception terminals by using IFFT (Inverse Fast Fourier Transform) and FFT (Fast Fourier Transform).

The MIMO-OFDM scheme uses the OFDM scheme by using multiple antennas at the transmission and reception terminal, and the mobile terminal obtains a diversity gain and a multiplexing gain from signals transmitted from the multiple antennas. However, if orthogonality between OFDM orthogonal signals is not maintained, a certain frequency offset between signals occurs and causes inter-symbol interference.

In order to solve the problem, a small cell technology can be applied to a HetNet (Heterogeneous Network) system. The HetNet system is a technology adopted as a standard in LTE (Long Term Evolution) communication and is applied differently depending on an arrangement scenario of a small cell (hereinafter, referred to as a small cell) with respect to a large cell (hereinafter, referred to as a macro cell). One of the scenarios is a heterogeneous network in which a plurality of small cells (femtocells, picocells, and the like) exist in the macro cell, and the macro cell and the small cell base station transmit signals in cooperation with each other. However, if the mobile terminal is located at an outer edge of the cell, an intercellular interference occurs due to a signal generated in an adjacent cell, and thus, reliability of the mobile terminal is degraded.

The CoMP (Coordinated Multi-Point) scheme, which is one of the most important schemes used in a HetNet system, is one of schemes for improving reliability of the mobile terminal degraded in the HetNet and is a scheme by which base stations in adjacent cell cooperate with each other. In a case of the CoMP scheme, the base stations can share information such as channel state information and feedback information of the mobile terminal with each other through a backhaul, and the base stations can increase throughput and reliability of the mobile terminal using the information in cooperation with each other.

However, in a case of the HetNet system, several cells exist in a network, and thereby, there is a problem of an intercellular interference signal, and the intercellular interference signal is a factor that lowers reliability of a wireless communication. Accordingly, a scheme of eliminating or mitigating interference is essentially required.

A technology of background of the present invention is disclosed in Korean Patent Publication No. 2015-0064834 (published on Jun. 12, 2015).

DISCLOSURE

Technical Problem

An object of the present invention is to provide a MIMO-OFDM-based intercellular cooperative communication system capable of improving reliability of a mobile terminal by mitigating influence of an intercellular interference occurring in a HetNet system and a cooperative communication method using the system.

Technical Solution

According to the present invention, an intercellular cooperative communication method using a MIMO-OFDM-based cooperative communication system in a heterogeneous network including a macro cell and a small cell having two antennas includes a step of grasping a location of a mobile terminal and a phase relationship between channels by receiving a channel state with a macro base station and a channel state with a second small base station from the mobile terminal using a first small base station in a first small cell, a step of transmitting a first signal in cooperation with the macro base station if the mobile terminal is located at a boundary between the first small cell and the second small cell, a step of receiving signals through first and second antennas using the mobile terminal, receiving the first signal from the two antennas of the first small base station and the two antennas of the macro base station, and receiving a second signal from the two antennas of the second small base station, and a step of detecting the first signal from a signal vector which is received by the first and second antennas.

In addition, a received signal $Y_i$ of an i-th antenna of the mobile terminal may be defined by a following equation $$Y_1 = \underbrace{(H_{11} + H_{12} + H_{13} + H_{14})}_{a1}X_1 + \underbrace{(H_{15} + H_{16})}_{b1}X_2 + N_1$$

$$Y_2 = \underbrace{(H_{21} + H_{22} + H_{23} + H_{24})}_{c1}X_1 + \underbrace{(H_{25} + H_{26})}_{d1}X_2 + N_2$$

where, $H_{i1}$ and $H_{i2}$ denote channels between the i-th antenna and the two antennas of the first small base station, $H_{i3}$ and $H_{i4}$ denotes channels between the i-th antenna and the two antennas of the macro base station, $H_{i5}$ and $H_{i6}$ denotes channels between the i-th antenna and the two antennas of the second small base station, $X_1$ denotes the first signal, $X_2$ denotes the second signal, and $N_i$ denotes noise of the i-th antenna.

In addition, the intercellular cooperative communication method may further include a step of generating constructive feedback information for increasing a magnitude of the first signal and destructive feedback information for reducing a magnitude of the second signal, based on a phase relationship between the channels; and a step of sharing the constructive feedback information and the destructive feedback information with the macro base station and the second small base station, respectively. The step of receiving the first and second signals using the mobile terminal may include receiving the first signal that is obtained by reflecting a pre-coding vector corresponding to the constructive feedback information on each channel with the first small base station and each channel with the macro base station, and receiving the second signal which is obtained by reflecting a pre-coding vector corresponding to the destructive feedback information on each channel with the second small base station.

In addition, the step of generating the feedback information may include generating the constructive feedback information for increasing a composite channel by $H_{i1}$, $H_{i2}$, $H_{i3}$, and $H_{i4}$ based on a phase difference between the channels $H_{i1}$, $H_{i2}$, $H_{i3}$, and $H_{i4}$, and generating the destructive feedback information for reducing a composite channel by $H_{i5}$ and $H_{i6}$ based on a phase difference between the channels $H_{i5}$ and $H_{i6}$.

In addition, a received signal $Y_i$ of an i-th antenna of the mobile terminal may be defined by a following equation $$Y_1 = \underbrace{(P_5(P_3(P_1H_{11} + P_2H_{12}) + P_4H_{13}) + P_6H_{14})}_{a2}X_1 +$$

$$\underbrace{(P_7H_{15} + P_8H_{16})}_{b2}X_2 + N_1$$

$$Y_2 = \underbrace{P_{13}(P_{11}(P_9H_{21} + P_{10}H_{22}) + P_{12}H_{23}) + P_{14}H_{24})}_{c2}X_1 +$$

$$\underbrace{(P_{15}H_{25} + P_{16}H_{26})}_{d2}X_2 + N_2$$

where $P_1$ to $P_6$ and $P_9$ to $P_{14}$ denote a plurality of pre-coding vectors which is reflected in $H_{i1}$ to $H_{i4}$ according to the constructive feedback information, $P_7$, $P_8$, $P_{15}$, and $P_{16}$ denote a plurality of pre-coding vectors which is reflected in $H_{i5}$ and $H_{i6}$ according to the destructive feedback information, $X_1$ denote the first signal, $X_2$ denote the second signal, and $N_i$ denote noise of the i-th antenna.

In addition, the step of detecting the first signal may include detecting the first signal from the received signal vector using an MMSE detection scheme.

In addition, the constructive feedback information and the destructive feedback information may each be a 2-bit signal, and include information for requesting to maintain a phase of one of the two channels while maintaining a phase of the other channel or rotating by 90 degrees or by 180 degrees, based on an angular section to which a phase difference between the two channels belongs, and the two channels may mean a single channel versus a single channel or a composite channel in which a plurality of channels are combined versus a single channel.

In addition, a pre-coding vector $P^c$ corresponding to the constructive feedback information and a pre-coding vector $P^d$ corresponding to the destructive feedback information may be defined by following equations $$P_2^c = \begin{cases} 1, & |\alpha^k| \leq \pi/4 & \text{(State1)} \\ e^{-j\pi}, & 3\pi/4 < \alpha^k \leq 5\pi/4 & \text{(State2)} \\ e^{-j\frac{\pi}{2}}, & \pi/4 < \alpha^k \leq 3\pi/4 & \text{(State3)} \\ e^{j\frac{\pi}{2}}, & 5\pi/4 < \alpha^k \leq 7\pi/4 & \text{(State4)} \end{cases} \text{ and}$$

-continued $$P_2^d = \begin{cases} e^{-j\pi}, & |\alpha^k| \leq \pi/4 & \text{(State1)} \\ 1, & 3\pi/4 < \alpha^k \leq 5\pi/4 & \text{(State2)} \\ e^{j\frac{\pi}{2}}, & \pi/4 < \alpha^k \leq 3\pi/4 & \text{(State3)} \\ e^{-j\frac{\pi}{2}}, & 5\pi/4 < \alpha^k \leq 7\pi/4 & \text{(State4)} \end{cases}$$

where $\alpha$ means a phase difference.

In addition, the present invention provides a MIMO-OFDM-based intercellular cooperative communication system including a macro base station having two antennas and first and second small base stations in first and second small cells. The first small base station includes a reception unit that receives a channel state with the macro base station and a channel state with the second small base station from a mobile terminal, an analysis unit that grasps a location of the mobile terminal and a phase relationship between channels, and a transmission unit that transmits a first signal in cooperation with the macro base station if the mobile terminal is located at a boundary between the first small cell and the second small cell. The mobile terminal receives signals through first and second antennas of the mobile terminal, receives the first signal from the two antennas of the first small base station and the two antennas of the macro base station, receives a second signal from the two antennas of the second small base station, and detects the first signal from a signal vector which is received by the first and second antennas.

In addition, the first small base station may further include a generation unit that generates constructive feedback information for increasing a magnitude of the first signal and destructive feedback information for reducing a magnitude of the second signal, based on a phase relationship between the channels, the transmission unit may share the constructive feedback information and the destructive feedback information with the macro base station and the second small base station, respectively, and the mobile terminal may receive the first signal that is obtained by reflecting a pre-coding vector corresponding to the constructive feedback information on each channel with the first small base station and each channel with the macro base station, and receive the second signal which is obtained by reflecting a pre-coding vector corresponding to the destructive feedback information on each channel with the second small base station.

In addition, the mobile terminal may detect the first signal from the received signal vector using an MMSE detection scheme.

Advantageous Effects

According to the present invention, there are advantages that communication throughput and reliability of the entire HetNet system can be enhanced by not only mitigating influence of an intercellular interference but also increasing reliability of the mobile terminal located at an edge of a cell, using a CoMP scheme by which base stations cooperate in a HetNet system, a pre-coding scheme by which a channel coefficient of a desired signal increases and a channel coefficient of an interference signal is reduced, and a MIMO detection scheme with an excellent signal detection performance.

DESCRIPTION OF THE DRAWINGS

FIG. 1 is a diagram illustrating an environment experienced by a transmission and reception terminal of a base station in each cell for intercellular interference mitigation in a MIMO-OFDM-based intercellular cooperative communication system according to an embodiment of the present invention.

FIG. 2 illustrates diagrams of general 1-bit-based constructive and destructive SPC schemes.

FIG. 3 illustrates diagrams of 2-bit constructive and destructive SPC schemes according to the embodiment of the present invention.

FIG. 4 is a diagram schematically illustrating one combined composite channel coefficient when using a general full-bit SPC (MRT).

FIG. 5 is a diagram illustrating a general inter-small-cell cooperative communication system.

FIG. 6 is a diagram illustrating a MIMO-OFDM-based cooperative communication system in a heterogeneous network according to the embodiment of the present invention.

FIG. 7 is a diagram illustrating a configuration of a small base station illustrated in FIG. 6.

FIG. 8 is a diagram illustrating an intercellular cooperative communication method using a CoMP scheme according to the embodiment of the present invention.

FIG. 9 is a diagram illustrating an intercellular cooperative communication method using the CoMP scheme and a pre-coding scheme according to the embodiment of the present invention.

FIG. 10 illustrates BER versus SNR graphs of a conventional system and a proposed system in a system model according to the present invention.

FIG. 11 illustrates BER versus SNR graphs representing throughputs of a conventional scheme and a proposed scheme according to the present invention.

FIG. 12 illustrates graphs representing BER versus SNR performance according to the number of bits of the pre-coding scheme.

FIG. 13 illustrates graphs representing a simulation result based on third and fourth proposed methods for the BER versus SNR performances of a ZF scheme and a MMSE scheme.

FIG. 14 illustrates graphs representing the BER versus SNR performance due to path attenuation caused by an increase in distance between a mobile terminal and a base station of an interference signal in a second proposed scheme according to the present invention.

DESCRIPTION OF EMBODIMENTS

Hereinafter, embodiments of the present invention will be described in detail with reference to the accompanying drawings such that those skilled in the art can easily implement the present invention.

The present invention is a technique of mitigating an intercellular interference in a heterogeneous network (hereafter, referred to as HetNet) adopted as a standard for LTE communication, and proposes a scheme capable of improving reliability of a system by mitigating the intercellular interference and increasing an SINR of a signal received by a mobile terminal located at a cell edge, using a CoMP (Coordinated Multi-Point) scheme whereby adjacent base stations in HetNet cooperate with each other, an SPC (Spatial Phase Coding) scheme which uses pre-coding, and an MMSE (Minimum Mean Square Error) scheme which is a MIMO detection scheme.

An embodiment of the present invention provides a method of mitigating an intercellular interference occurring when a mobile terminal is located at an outer edge of a cell and is based on an OFDM transmission method that is the most basic wireless communication. The embodiment of the present invention considers a MIMO-OFDM system which uses M transmission antennas and N reception antennas.

FIG. 1 is a diagram illustrating a process of a transmission and reception terminal of a base station in a cell so as to mitigate an interference in an intercellular cooperative communication system according to an embodiment of the present invention. In FIG. 1, the left side corresponds to a transmission terminal and the right side corresponds to a reception terminal.

Signals transmitted from the transmission terminal are converted from series to parallel, are modulated. and are converted into symbols. Before being converted into an OFDM symbol, the symbol is pre-coded at the transmission terminal by a pre-coding vector obtained through feedback information obtained by channel estimation and channel state information (CSI) in an interleaved OFDM (IOFDM) step of a receiver.

After this process, the pre-coded symbols are inserted into each subcarrier wave of the OFDM symbol through IFFT, and the OFDM symbols are transmitted to the reception terminal together with the cyclic prefix (CP) in the form of a waveform. After the signal passes through a multipath fading channel, noise is added to the signal by a receiver, and then the signal is detected after the IOFDM process. After that, the signal can be estimated through a demodulation process.

As illustrated in FIG. 1, a scheme whereby the receiver generates a pre-coding vector by receiving CSI and pre-codes the generated pre-coding vector into a modulated symbol is referred to as an SPC scheme. Here, the SPC scheme includes a constructive SPC scheme of further improving a magnitude of a signal and a destructive SPC scheme of reducing the magnitude of a signal.

FIG. 2 illustrates diagrams of general 1-bit based constructive and destructive SPC schemes. (a) of FIG. 2 illustrates the 1-bit constructive SPC scheme, and (b) of FIG. 2 illustrates the 1-bit disruptive SPC scheme.

Equation 1 represents a pre-coding vector used for the 1-bit constructive SPC scheme.

$$P_1^c = \begin{cases} 1, & |\alpha^k| \le \pi/2 \quad \text{(State1)} \\ e^{-j\pi}, & \pi/2 < |\alpha^k| \le \pi \quad \text{(State2)} \end{cases} \qquad \text{[Equation 1]}$$

At this time, since a signal of 1 bit is used, states 1 and 2 can be classified into a signal of "1" and a signal of "0".

Equation 1 illustrates that, in a case of the 1-bit constructive SPC scheme, a phase is maintained when a phase difference between two channels $H_1^k$ and $H_2^k$ is less than 90 degrees (acute angle), and a phase of either one ($H_2^k$ in a case of FIG. 2) of the channels is rotated by 180 degrees ($e^{-j\pi}$) to be changed when the phase difference is greater than 90 degrees (obtuse angle), and thereby, a size of the combined channel between the two channels is increased to increase a magnitude of a signal (desired signal) therethrough.

In a case of (a) of FIG. 2, a relative phase difference ($\alpha$) between $H_1^k$ and $H_2^k$ is an obtuse angle, and since $P = e^{-j\pi}$ is selected according to Equation 1, $H_2^k$ has to be rotated by 180 degrees. That is, if $H_2^k$ is multiplied by the pre-coding vector ($P = e^{-j\pi}$), a phase of $H_2^k$ can be changed by 180 degrees. A result of the rotation is the same as $\hat{H}_T^k$.

It can be seen that a size of the combined channel between $\hat{H}_T^k$ between $H_1^k$ and $H_2^k$ after the phase change is larger than a size of the combined channel $H_T^k$ between $H_1^k$ and $H_2^k$ before the phase change. As described above, if a composite channel coefficient of the two channels is increased, the received SNR of the received signal can be increased without increasing power of the transmitted signal.

Equation 2 represents a pre-coding vector used for the 1-bit destructive SPC scheme.

$$P_1^d = \begin{cases} e^{-j\pi}, & |\alpha^k| \leq \pi/2 \quad \text{(State1)} \\ 1, & \pi/2 < |\alpha^k| \leq \pi \quad \text{(State2)} \end{cases} \quad \text{[Equation 2]}$$

Equation 2 has opposite characteristics to Equation 1. That is, when the phase difference between the two channels is less than or equal to 90 degrees (acute angle), the phase of either one of the two channels is rotated by 180 degrees to be changed, and thereby, the size of the combined channel between the two channels can be reduced to reduce a magnitude of a signal (interference signal) therethrough.

In a case of (b) of FIG. 2, the phase difference a between the two channels $H_1^k$ and $H_2^k$ is an acute angle, and since $P=e^{-j\pi}$ is selected according to Equation 2, $H_2^k$ is rotated by 180. degrees. Here, it can be seen that the size of the composite channel $\hat{H}_T^k$ after the phase change is more reduced than the size of the combined channel $H_T^k$ before the phase change. By using this, the signal (interference signal) can be reduced.

FIG. 3 illustrates diagrams of 2-bit constructive and destructive SPC schemes according to the embodiment of the present invention. (a) of FIG. 3 illustrates the 2-bit constructive SPC scheme and (b) of FIG. 3 illustrates the 2-bit disruptive SPC scheme.

Since the 2-bit constructive and destructive SPC scheme can increase and decrease more effectively the size of the composite channel coefficient by further subdividing relative phases of two signals and dividing state to modify the phase. If the 1-bit SPC rotates the channel coefficient by 180 degrees according to the state, the 2-bit SPC rotates the channel coefficient by 90 degrees.

Equation 3 represents a pre-coding vector used for the 2-bit constructive SPC scheme.

$$P_2^c = \begin{cases} 1, & |\alpha^k| \leq \pi/4 \quad \text{(State1)} \\ e^{-j\pi}, & 3\pi/4 < \alpha^k \leq 5\pi/4 \quad \text{(State2)} \\ e^{-j\frac{\pi}{2}}, & \pi/4 < \alpha^k \leq 3\pi/4 \quad \text{(State3)} \\ e^{j\frac{\pi}{2}}, & 5\pi/4 < \alpha^k \leq 7\pi/4 \quad \text{(State4)} \end{cases} \quad \text{[Equation 3]}$$

At this time, since a signal of two bits is used, states 1, 2, 3, and 4 can be classified into signals of "00", "01", "10", and "11", respectively.

In Equation 3, a current phase is maintained if the pre-coding vector P is "1", the phase is rotated by 90 degrees if the pre-coding vector P is $e^{-j\pi/2}$, the phase is rotated by 180 degrees if the pre-coding vector P is $e^{-j\pi}$, and the phase is rotated by 90 degrees in the opposite direction if the pre-coding vector P is $e^{j\pi/2}$.

Equation 4 represents a pre-coding vector used for the 2-bit destructive SPC scheme.

$$P_2^d = \begin{cases} e^{-j\pi}, & |\alpha^k| \leq \pi/4 \quad \text{(State1)} \\ 1, & 3\pi/4 < \alpha^k \leq 5\pi/4 \quad \text{(State2)} \\ e^{j\frac{\pi}{2}}, & \pi/4 < \alpha^k \leq 3\pi/4 \quad \text{(State3)} \\ e^{-j\frac{\pi}{2}}, & 5\pi/4 < \alpha^k \leq 7\pi/4 \quad \text{(State4)} \end{cases} \quad \text{[Equation 4]}$$

Thus, the 2-bit constructive and destructive SPC schemes are similar to the 1-bit constructive and destructive SPC schemes, but a phase difference between the two channels can be further subdivided to more effectively increase or decrease the size of the combined channel coefficient.

That is, by using this, reliability is increased by increasing the composite channel coefficient of the desired signal, and influence of an interference signal is reduced by decreasing the composite channel coefficient of an undesired interference signal, and thereby, reliability of the mobile terminal can be improved.

FIG. 4 is a diagram schematically illustrating a combined composite channel coefficient when the full-bit SPC (MRT) is used.

In FIG. 4, when a channel coefficient of a desired signal is a black line, a channel coefficient of a cooperative signal is a red line and one combined composite channel coefficient is a blue line, a red dotted line is a signal obtained by performing phase-rotation of the cooperative signal, and in a case of MRT, the phase is adjusted by using all bits. At this time, as the number of bits increases, the state can be further subdivided and the phase difference is gradually reduced. As a result, the channel coefficients of the signal obtained by performing phase rotation of the cooperative signal looks the same direction as a desired signal. That is, a phase difference between the two signals becomes zero.

Accordingly, if the MRT is used, the composite channel coefficient of the desired signal and the cooperative signal is maximized, and at this time, an SNR of the mobile terminal can be maximized. However, implementing such an infinite number of bits is very complex and practically impossible. Accordingly, the embodiment of the present invention uses a 2-bit SPC scheme with a low complexity and a performance similar to the MRT.

When a mobile terminal is located at an outer edge of a cell, a desired signal and an interference signal are mixed in a signal received by the mobile terminal. At this time, in a case of a general MISO (Multiple-Input and Single-Output) system, reliability is rapidly reduced due to interference and noise in the process of compensating for a desired signal so as to detect the desired signal.

The embodiment of the present invention performs a MIMO signal detection process in a receiver based on the MIMO system, and thereby, a desired signal can be detected more effectively. A general MIMO-OFDM system received signal is represented by following Equation 5.

$$\underbrace{\begin{bmatrix} Y_1 \\ Y_2 \\ \vdots \\ Y_{N_r} \end{bmatrix}}_{Y} = \underbrace{\begin{bmatrix} H_{11} & H_{12} & \cdots & H_{1N_t} \\ H_{21} & H_{22} & \cdots & H_{2N_t} \\ \vdots & \vdots & \ddots & \vdots \\ H_{N_r 1} & H_{N_r 2} & \cdots & H_{N_r N_t} \end{bmatrix}}_{H} \underbrace{\begin{bmatrix} X_1 \\ X_2 \\ \vdots \\ X_{N_t} \end{bmatrix}}_{X} + \underbrace{\begin{bmatrix} N_1 \\ N_2 \\ \vdots \\ N_{N_r} \end{bmatrix}}_{N} \quad \text{[Equation 5]}$$

Equation 5 represents a signal $Y$ received by the mobile terminal when $N_t$ transmission antennas exist and $N_r$ reception antennas exist in FIG. 1.

$Y$ denotes a ($N_r$, 1) dimensional received signal vector, and $X$ denotes a ($N_t$, 1) dimensional transmission signal vector. $N$ represents an ($N_r$, 1) dimensional noise, that is, AWGN (additive white Gaussian noise), which follows a Gaussian probability distribution with an average of 0 and a variance of 1. $H$ denotes a channel matrix having an ($N_r$, $N_t$) dimension. Elements $H_{ij}$ (i=1, 2, . . . , Nr, j=1, 2, . . . , $N_t$) represent channel coefficients from a j-th transmission antenna to an i-th reception antenna.

In a case of the embodiment of the present invention, an MMSE detection scheme is used to improve reliability of the mobile terminal.

The conventional Zero Forcing (ZF) scheme for comparison with the MMSE scheme will be described. As represented by Equation 6 and Equation 7 below, a signal desired by the mobile terminal can be obtained through a transmission signal vector $\hat{X}_{ZF}$ estimated by multiplying a filter matrix $G_{ZF}$ and a received signal vector $Y$.

$$G_{ZF} = H^+ = (H^H H)^{-1} H^H \quad \text{Equation 6}$$

$$\hat{X}_{ZF} = G_{ZF} Y \quad \text{Equation 7}$$

In Equation 6, + represents a complex conjugate transposition, and H represents a hermitian operator. The filter matrix $G_{ZF}$ represents the Moore-Penrose pseudo-inverse of a channel matrix $H$ and equations thereof are as above.

The ZF scheme amplifies noise in a process of multiplying the pseudo inverse matrix of the channel, and accordingly, performance of the mobile is degraded. In order to prevent this, the embodiment of the present invention does not use the ZF scheme and uses the MMSE scheme which is a MIMO detection scheme.

The MMSE scheme is a method of estimating the transmitted signal by multiplying the received signal by the Moore-Penrose pseudo inverse matrix of the channel matrix, thereby, preventing the noise from being amplified and improving a detection performance of a desired signal, and thus, reliability of the mobile terminal can be improved. At this time, the filter matrix and the estimated transmission signal vector can be represented by following Equation 8 and Equation 9.

$$G_{MMSE} = (H^H H + \sigma^2 I)^{-1} H^H \quad [\text{Equation 8}]$$

$$\hat{X}_{MMSE} = G_{MMSE} Y \quad [\text{Equation 9}]$$

In Equation 8, $\sigma^2$ represents a variance of the noise AWGN, and 1 represents a unit matrix. A detection process of a signal in Equation 9 is similar to a detection process of the ZF scheme in Equation 7, noise is prevented from being amplified by adding dispersion of the noise so as to reduce a bit error rate more than the ZF scheme, and thus, it is possible to further improve performance of the terminal.

FIG. 5 is a diagram illustrating a general inter-small-cell cooperative communication system.

The system illustrated in FIG. 5 includes first and second small cell base stations SBS1 and SBS2 existing in femtocells 1 and 2 which are small cells, and a mobile terminal M located at an outer edge of the cells. Each of the base stations SBS1 and SBS2 transmits signals through two transmission antennas and the mobile terminal M receives signals through two reception antennas.

There are four channels between the transmission antennas of the base stations and the reception antenna of the mobile terminal, and there are a total of eight channels in the system because there are two base stations.

Among the channels, $H_{11}$, $H_{12}$, $H_{21}$, and $H_{22}$ represent channel coefficients between the first small cell base station SBS1 and the mobile terminal M. Here, it is assumed that the mobile terminal M wants to receive a signal of the first small cell base station SBS1. In addition, $H_{13}$, $H_{14}$, $H_{23}$, and $H_{24}$ represent channel coefficients between the second small cell base station SBS2 and the mobile terminal M, which corresponds to a channel coefficient of an interference signal due to the adjacent base station SBS2 therearound from the viewpoint of the mobile terminal M.

At this time, the received signal of the mobile terminal M is represented by Equation 10.

$$Y_1 = (H_{11} + H_{12})X_1 + (H_{13} + H_{14})X_2 + N_1$$

$$Y_2 = (H_{21} + H_{22})X_1 + (H_{23} + H_{24})X_2 + N_2 \quad [\text{Equation 10}]$$

Here, $Y_1$ and $Y_2$ denote received signal vectors of the first and second reception antennas of the mobile terminal, and $N_1$ and $N_2$ denote noise at that time.

As represented by Equation 10, it can be seen that, in addition to the desired signal, an interference signal due to the adjacent cell is also received by the mobile terminal M.

The method illustrated in FIG. 5 does not adopt the CoMP scheme and the MIMO detection scheme, thereby, operating like a MISO-OFDM system, and in addition to the desired signal, the interference signal is directly input into the received signal, and thereby, performance of the terminal is severely degraded.

However, unlike FIG. 5, the following embodiments of the present invention improves the performance of the mobile terminal by using the CoMP scheme using an inter-cell cooperation, a pre-coding scheme of increasing a channel coefficient of the desired signal and reducing a channel coefficient of the interference signal, and an MMSE scheme with an excellent signal detection performance, such that performance degradation of the mobile terminal due to inter-cell interference in a heterogeneous network (HetNet) is mitigated.

FIG. 6 is a diagram illustrating a MIMO-OFDM-based cooperative communication system in a heterogeneous network according to the embodiment of the present invention.

The HetNet system includes a macro cell and a plurality of small cells (femtocells) included in the macro cell, and a base station is located in each cell. The small cell may include various cells such as a picocell and a femtocell, but the following embodiment will exemplify the femtocell.

As illustrated in FIG. 6, an inter-cell cooperative communication system according to the embodiment of the present invention includes a macro base station (large base state; LBS), first and second small base stations (SBS), and the mobile terminal M. The macro base station LBS is a base station in a macro cell and the small base station SBS is a base station in a small cell (femtocell).

FIG. 6 illustrates a case where three base stations including two small cells (femtocells 1 and 2) exist in the macro cell. It is assumed that the macro base station LBS and the mobile terminal M each have two transmission and reception antennas. Compared with FIG. 5, FIG. 6 illustrates a channel added between the macro base station LBS and the mobile terminal M.

The respective base stations LBS and SBS can transmit signals in cooperation with each other according to the CoMP scheme. The small base station SBS can receive channel state information estimated by the mobile terminal M in its small cell and can share the channel state information, various necessary information, transmission signals, and the like with other peripheral small base stations SBS and the macro base station LBS. Each of the base stations LBS and SBS cooperates with each other at the time of signal transmission based on the shared information, thereby, improving a magnitude of a signal desired by the mobile terminal M, reducing the magnitude of the signal acting as interference to mitigate the interference.

The embodiment of the present invention improves reliability of the system by reducing an interference influenced by the adjacent cell even if the mobile terminal is located at a cell boundary (edge) by using a CoMP scheme by which the macro base station LBS in the macro cell and the small base stations SBS1 and SBS2 in the small cell cooperate with each other, and an SPC scheme by which each base station multiplies a transmission signal by a pre-coding vector based on a channel phase difference between the respective base station LBS and SBS and the mobile terminal M and transmits the multiplied signal.

The constructive SPC scheme further improves the magnitude of a signal, and the destructive SPC scheme reduces the magnitude of a signal, and as each base station applies a constructive SPC scheme to a signal desired by the mobile terminal M and applies a destructive SPC scheme to an undesired signal, influence of the interference caused by an adjacent cell is mitigated by performing a cooperative communication.

As described above, the embodiment of the present invention provides the CoMP scheme by which the base station LBS in the macro cell and the base stations SBS1 and SBS2 in the femtocell cooperate with each other and an interference mitigation scheme using the pre-coding scheme. In addition, the mobile terminal M receiving a signal from the base station uses the MMSE scheme when detecting a desired signal from the received signal, and thereby, a detection performance is increased.

The embodiment of the present invention includes four methods. A first method adopts only the CoMP scheme, and a second method adopts the CoMP scheme and the pre-coding scheme. A third method is a method improved from the first method and adopts the CoMP scheme and the MMSE scheme, and a fourth method is a method improved from the second method and adopts the CoMP scheme, the pre-coding method, and the MMSE scheme. As will be described below, performance of the system further increases as proceeding to the fourth method.

As illustrated in FIG. 6, if the mobile terminal M is located at a boundary between the first and second small cells SBS1 and SBS2, a transmission signal (hereinafter, referred to as a first signal) of the first small base station SBS1 in the first small cell (femtocell 1), which is a signal desired by the mobile terminal M, is influenced by a path loss and a transmission signal power attenuation due to a distance between the first small base station SBS1 and the mobile terminal M, and is influenced by an interference signal (hereinafter, referred to as a second signal) transmitted from the second small base station SBS2 in the adjacent second small cell (femtocell 2), thereby, being distorted.

A configuration of the small base station in the embodiment of the present invention will be described as follows.

FIG. 7 is a diagram illustrating the configuration of the small base station illustrated in FIG. 6. As illustrated in FIG. 7, the small base station SBS includes a reception unit 710, an analysis unit 720, a generation unit 730, and a transmission unit 740. The generation unit 730 can be omitted in the first and third methods that do not use pre-coding.

Hereinafter, for the sake of convenient description, it is assumed that the small base station of FIG. 7 is the first small base station SBS1. In addition, it is assumed that the mobile terminal M wants to receive a signal transmitted by the first small base station SBS1 belonging to the first small cell (femtocell 1). Therefore, the signal transmitted by the second small base station SBS2 in the second small cell becomes an interference signal thereto.

The reception unit 710 of the first small base station SBS1 receives a channel state between the mobile terminal M and the macro base station LBS and a channel state between the mobile terminal M and the second small base station SBS2, from the mobile terminal M. Here, there are 12 channels in FIG. 6.

The mobile terminal M estimates the channel state for each of the 12 channels and transmits the estimated channel state information (CSI) to the first small base station SBS1 in the first small cell (femtocell 1). Accordingly, the reception unit 710 receives the channel state information on the twelve channels from the mobile terminal M.

The transmission unit 740 transmits the channel state information received from the mobile terminal M to peripheral base stations and shares the channel state information. That is, the first small base station SBS1 receiving the channel state information from the mobile terminal M can share the channel state information with other base stations LBS and SBS2.

The analysis unit 720 grasps a location of the mobile terminal based on the received channel state information and grasps a phase relationship (in particular, a phase difference) between the channels. At this time, the technique of grasping or estimating a location of the relevant terminal based on the channel state information transmitted from the terminal is well known, and thus, a detailed description thereof will be omitted. Of course, it is obvious that the remaining base stations can also grasp the current location of the mobile terminal M based on the shared channel state information and grasp the phase relationship between the twelve channels.

As a result of grasping the location, if the mobile terminal M is located at a boundary between the two small cells and is influenced by the interference caused by the adjacent cell (femtocell 2) as illustrated in FIG. 6, the first small base station SBS1 transmits a first signal in cooperation with the macro base station LBS.

That is, the transmission unit 740 transmits the first signal to the mobile terminal M in cooperation with the macro base station LBS. Accordingly, the mobile terminal M receives the first signal through the first and second antennas which are two antennas of the mobile terminal M, and at this time, receives the second signal transmitted from the second small base station SBS2, that is, an interference signal, in addition to the first signal.

However, if the mobile terminal M is located at the boundary between the two small cells in this way, the first and third methods merely perform an intercellular cooperative transmission through the CoMP scheme. However, the second and fourth methods further use the pre-coding scheme at the time of signal transmission using the generation unit 730 in addition to the CoMP scheme.

That is, if the mobile terminal M is located at the boundary between the cells, the generation unit 730 respectively generates feedback information for increasing a magnitude of the desired signal (first signal) and decreasing the interference signal (second signal) due to adjacent cell.

That is, the generation unit 730 generates constructive feedback information for increasing the magnitude of the first signal and destructive feedback information for reducing the magnitude of the second signal based on a phase relationship between the channels. The transmission unit 740 transmits the constructive feedback information to the macro base station LBS and transmits the destructive feedback information to the second small base station SBS2.

Accordingly, the mobile terminal M receives the first signal from the first small base station SBS1 and the macro base station LBS later, that is, receives the first signal obtained by reflecting the pre-coding vector corresponding to the constructive feedback information onto each channel with the first small base station SBS1 and each channel with the macro base station LBS. In addition, the mobile terminal M receives the second signal from the second small base station SBS2, that is, receives the second signal obtained by reflecting the pre-coding vector corresponding to the destructive feedback information onto each channel with the second small base station SBS2.

Hereinafter, the first and third schemes that do not use the pre-coding in the present invention will be described in detail with reference to FIG. 8. First, the first method of the present invention adopts the CoMP scheme cooperating with each other between the cells in the system of FIG. 6.

FIG. 8 is a diagram illustrating an intercellular cooperative communication method using the CoMP scheme in the embodiment of the present invention. In general, if a base station and a terminal are connected by a backhaul in a HetNet system, a location and phase information of the mobile terminal M can be shared and utilized, and thus, the macro base station LBS can transmit a signal (first signal) transmitted from the first small base station SBS1 to the mobile terminal M in cooperation with the first small base station SBS1.

First, the first small base station SBS1 in the first small cell receives a channel state with the macro base station LBS and a channel state with the second small base station SBS2, from the mobile terminal M (S810). Then, the transmission unit 740 transmits the received channel state information to other peripheral base stations and shares the channel state information (S820).

Thereafter, the analysis unit 720 grasps a location of the mobile terminal and a phase relationship between the channels based on the received channel state information (S830). As a result of grasping the location, if the mobile terminal M is located at a border between cells as illustrated in FIG. 6, the first small base station SBS1 transmits the first signal in cooperation with the macro base station LBS (S840).

Here, the mobile terminal M receives signals from the peripheral base stations through the first and second antennas thereof, that is, receives a first signal (desired signal) from two antennas of the first small base station SBS1 and from two antennas of the macro base station LBS and receives a second signal (interference signal) from two antennas of the second small base station SBS2.

In this case, the signal received by the mobile terminal M is represented by Equation 11.

$$Y_1 = \underbrace{(H_{11} + H_{12} + H_{13} + H_{14})}_{a1} X_1 + \underbrace{(H_{15} + H_{16})}_{b1} X_2 + N_1 \quad \text{[Equation 11]}$$

$$Y_2 = \underbrace{(H_{21} + H_{22} + H_{23} + H_{24})}_{c1} X_1 + \underbrace{(H_{25} + H_{26})}_{d1} X_2 + N_2$$

Here, $Y_i$ represents the received signal of the i-th antenna of the mobile terminal. $X_1$ is the first signal (desired signal) transmitted by the first small base station SBS1 in cooperation with the macro base station LBS, $X_2$ is the second signal (interference signal) transmitted by the second small base station SBS2, and $N_i$ represents an AWGN noise of the i-th antenna.

In addition, among the 12 pieces of channel information illustrated in FIG. 6, $H_{i1}$ and $H_{i2}$ are channels between the i-th antenna and two antennas of the first small base station SBS1, $H_{i3}$ and $H_{i4}$ are channels between the i-th antenna and two antennas of the macro base station LBS, and $H_{i5}$ and $H_{i6}$ represent channels between the i-th antenna and two antennas of the second small base station SBS2.

In Equation 11, a1 and c1 denote composite channel coefficients for a signal desired by the mobile terminal M, and b1 and d1 denote composite channel coefficients for the interference signal. Therefore, since b1 and d1 are channels through which a noise signal is received from the viewpoint of the mobile terminal M, b1 and d1 causes a reception SNR of the desired signal to be reduced.

As described above, if the CoMP scheme is adopted, a signal of the macro cell and a signal of the femtocell 1 cooperate with each other, and thereby, performance of the mobile terminal M can increase, but since the first method still does not use the pre-coding scheme and the MIMO detection scheme, the performance is not improved greatly.

After step S840, the mobile terminal M has to detect the first signal $X_1$, which is a desired signal, from the received signal vector using the first and second antennas thereof.

At this time, the mobile terminal M can use the MMSE detection scheme as a signal detection scheme for detecting the first signal from the received signal vector (S850). This corresponds to the third scheme of the present invention, and further enhances a signal detection performance and reliability of the mobile terminal.

The MMSE detection scheme applied in step S850 will now be described. First, the received signal vector for the signal received by the mobile terminal M through the first and second antennas thereof is as follows.

$$\underbrace{\begin{bmatrix} Y_1 \\ Y_2 \end{bmatrix}}_{\mathbb{Y}_1} = \underbrace{\begin{bmatrix} a1 & b1 \\ c1 & d1 \end{bmatrix}}_{\mathbb{H}_1} \underbrace{\begin{bmatrix} X_1 \\ X_2 \end{bmatrix}}_{\mathbb{X}_1} + \underbrace{\begin{bmatrix} N_1 \\ N_2 \end{bmatrix}}_{\mathbb{N}_1} \quad \text{[Equation 12]}$$

Equation 12 is one matrix of the received signals $Y_1$ and $Y_2$ of the first and second antennas of the mobile terminal M represented by Equation 11.

Here, the composite channel coefficients a1, b1, c1, and d1 obtained by Equation 11 can be represented by one channel matrix, and a desired signal detection can be estimated by multiplying filter matrixes $G_{MMSE}$ and $\mathbb{Y}_1$ which are a Moore-Penrose pseudo inverse matrix of the channel matrix like Equation 9. If the MIMO detection scheme is used in this way, noise is prevented from being amplified, and thereby, higher performance than the first and second methods according to the present invention is obtained.

The second method is obtained by applying the pre-coding scheme to the CoMP scheme, and the desired signal is pre-coded constructively and the interference signal is destructively pre-coded. As a result, by making the composite channel coefficient of the desired signal (the first signal) large, a reception SNR of the terminal is increased and the composite channel coefficient of the interference signal (the second signal) is decreased, and thus, it is possible to improve performance of the terminal.

FIG. 9 is a diagram illustrating an intercellular cooperative communication method using the CoMP scheme and the pre-coding scheme in the embodiment of the present invention. Here, step S910 to step S930 in FIG. 9 are the same as step S810 to step S830 in FIG. 8, and thus, detailed description thereof will be omitted.

First, the first small cell base station SBS1 receives a channel state with the macro base station LBS and a channel state with the second small base station SBS2, from the mobile terminal M, and grasps a location of the mobile terminal M and a phase relationship between the channels (S910 to S930).

If it is determined that the mobile terminal M is located at a boundary between the two cells SBS1 and SBS2 as illustrated in FIG. 6 and is influenced by an adjacent cell, the first small cell base station SBS1 generates constructive and destructive feedback information for increasing a magnitude of the desired signal and reducing the interference signal due to the adjacent cell, respectively, and transmits the generated feedback information to peripheral base stations (S940).

That is, the first small cell base station SBS1 generates the constructive feedback information for increasing a magnitude of the first signal and the destructive feedback information for reducing a magnitude of the second signal, based on the phase relationship between the respective channels, transmits the constructive feedback information to the macro base station LBS, and transmits the destructive feedback information to the second small base station SBS2.

Then, the first small base station SBS1 and the macro base station LBS cooperate with each other to transmit the first signal, that is, multiplies the pre-coding vector corresponding to the constructive feedback information by a relevant channel and transmits the first signal, and the second small base station SBS2 multiplies the pre-coding vector corresponding to the destructive feedback information by a relevant channel and transmits the second signal (S950).

Each of the constructive feedback information and the destructive feedback information can be configured by a 2-bit signal as described in Equation 3 and Equation 4. That is, in a case of the second method as illustrated in FIG. 3, a 2-bit constructive SPC scheme is applied to the desired signal and a 2-bit destructive SPC scheme is applied to the interference signal.

Equation 3 described above represents a pre-coding vector $P^c$ corresponding to the constructive feedback information, and Equation 4 described above represents a pre-coding vector $P^d$ corresponding to the destructive feedback information. In Equations 3 and Equation 4, it means that a current phase is maintained if the pre-coding vector P is "1", the phase is rotated by 90 degrees if the pre-coding vector P is $e^{-j\pi/2}$, the phase is rotated by 180 degrees if the pre-coding vector P is $e^{-j\pi}$, and the phase is rotated by 90 degrees in the opposite direction if the pre-coding vector P is $e^{j\pi/2}$.

As described above, the feedback information includes information for requesting to maintain a phase of one of the two channels, while maintaining and rotating a phase of the other channel by 90 degrees and 180 degrees, based on an angular section to which a phase difference between the two channels belongs. Here, the term "two channels" is not simply limited to "single channel" versus "single channel", and may mean "composite channel", in which a plurality of channels are combined, versus "single channel".

In step S950, the mobile terminal M receives the first signal from the first small base station SBS1 and the macro base station LBS, that is, receives a first signal $X_1$ obtained by reflecting the pre-coding vector corresponding to the constructive feedback information on the channels $H_{i1}$ to $H_{i2}$ formed with the first small base station SBS1 and the channels $H_{i3}$ to $H_{i4}$ formed with the macro base station LBS. In addition, the mobile terminal M receives the second signal from the second small base station SBS2, that is, receives a second signal $X_2$ obtained by reflecting the pre-coding vector corresponding to the destructive feedback information on the channels $H_{i5}$ and $H_{i6}$ formed with the second small base station SBS2.

The signal received by the mobile terminal is expressed by following Equation 13.

$$Y_1 = \underline{(P_5(P_3(P_1H_{11} + P_2H_{12}) + P_4H_{13}) + P_6H_{14})X_1}_{a2} + \quad \text{[Equation 13]}$$

$$\underline{(P_7H_{15} + P_8H_{16})X_2}_{b2} + N_1$$

$$Y_2 = \underline{P_{13}(P_{11}(P_9H_{21} + P_{10}H_{22}) + P_{12}H_{23}) + P_{14}H_{24})X_1}_{c2} +$$

$$\underline{(P_{15}H_{25} + P_{16}H_{26})X_2}_{d2} + N_2$$

Here, $P_1$ to $P_6$ and $P_9$ to $P_{14}$ denote a plurality of pre-coding vectors reflected in $H_{i1}$ to $H_{i4}$ according to the constructive feedback information, $P_7$, $P_8$, $P_{15}$, and $P_{16}$ denote a plurality of pre-coding vectors reflected in $H_{i5}$ and $H_{i6}$ according to the destructive feedback information, $X_1$ denote the first signal, $X_2$ denote the second signal, and $N_i$ denote noise of the i-th antenna.

Comparing Equation 13 with Equation 11, a1<a2 and c1<c2 are obtained by applying $P_1$ to $P_6$ and $P_9$ to $P_{14}$ using the constructive SPC scheme, and b1>b2 and d1>d2 are obtained by applying $P_7$, $P_8$, $P_{15}$, and P16 using the destructive SPC scheme. That is, an SNR of a signal component desired by the mobile terminal increases, an SNR of an interference signal component not desired by the mobile terminal is reduced, and an SINR of the entire received signal increases.

In addition, as can be seen from Equation 13, the generation unit 730 can generate the constructive feedback information for increasing the composite channel by $H_{i1}$, $H_{i2}$, $H_{i3}$, and $H_{i4}$ based on the phase difference between $H_{i1}$, $H_{i2}$, $H_{i3}$, and $H_{i4}$, and generate the destructive feedback information for reducing the composite channel by $H_{i5}$ and $H_{i6}$ based on the phase difference between $H_{i5}$ and $H_{i6}$.

Specifically, the constructive feedback information for increasing the composite channel by $H_{i1}$ to $H_{i4}$ is generated based on a phase difference between the $H_{i1}$ and $H_{i2}$, a phase difference between $H_{i3}$ and a channel obtained by combining $H_{i1}$ and $H_{i2}$, and a phase difference between $H_{i4}$ and a composite channel obtained by combining $H_{i1}$ and $H_{i3}$. In addition, the destructive feedback information for reducing the composite channel by $H_{i5}$ and $H_{i6}$ is generated based on a phase difference between $H_{i5}$ and $H_{i6}$.

For example, $P_1$ and $P_2$ applied to each channel are generated based on a phase difference between $H_{11}$ and $H_{12}$, and since the feedback information includes information for maintaining a phase of one of the two channels while maintaining or changing a phase of the other channel, $P_1$ can have a value for maintaining a current phase of $H_{11}$, and $P_2$ may have a value for maintaining or changing a phase of $H_{12}$. Next, a phase of the composite channel between $H_{11}$ and $H_{12}$ is compared with a phase of $H_{13}$ which is a single channel to generate $P_3$ and $P_4$ respectively applied to the composite channel and the single channel, and similarly, $P_3$ may have a value that maintains the current phase.

In a case of the second scheme, pre-coding is performed by adopting the SPC scheme, and thereby, performance of the mobile terminal M increases but the MIMO detection scheme is still not applied. Accordingly, influence of an interference remains in the received signal of the mobile terminal M, and thus, a signal detection performance is not high enough to satisfy QoS of a user.

That is, after step S950, the mobile terminal M has to detect the first signal $X_1$ which is a desired signal from a signal vector received by its first and second antennas thereof. At this time, the mobile terminal M may use the MMSE detection scheme as a signal detection scheme for detecting the first signal from the received signal vector (S960). This corresponds to the fourth scheme according to the present invention, and a signal detection performance and reliability of the mobile terminal is further enhanced therethrough.

The MMSE detection scheme applied in step S960 will be described below.

The received signal vector for a signal received by the mobile terminal M through the first and second antennas thereof is as follows.

$$\underbrace{\begin{bmatrix} Y_1 \\ Y_2 \end{bmatrix}}_{Y_2} = \underbrace{\begin{bmatrix} a2 & b2 \\ c2 & d2 \end{bmatrix}}_{H_2} \underbrace{\begin{bmatrix} X_1 \\ X_2 \end{bmatrix}}_{X_2} + \underbrace{\begin{bmatrix} N_1 \\ N_2 \end{bmatrix}}_{N_2} \quad \text{[Equation 14]}$$

a2 and c2 are the composite channel coefficients of the desired signal which is constructively pre-coded, and b2 and d2 denote the composite channel coefficients of a destructively pre-coded interference. At this time, a2, b2, c2, and d2 can be represented by one channel matrix, and the desired signal can be estimated by multiplying a filter matrix by a received signal vector. If the CoMP scheme, the pre-coding scheme, and the MIMO detection scheme are simultaneously applied as in the last method, it is possible to maximize throughput and reliability by increasing a reception SNR of the mobile terminal M.

As a result, the intercellular interference mitigation scheme proposed by the embodiment of the present invention mitigates an intercellular interference by increasing the reception SNR of a desired signal and decreasing an SNR of an interference signal by using the CoMP scheme, the pre-coding scheme, and the MIMO detection scheme when the mobile terminal is located at an outer edge of the cell, and thereby, an SINR of the entire received signal is increased and reliability and throughput of a wireless communication between a base station and a mobile terminal are increased.

A simulation was performed to compare BER performances between the scheme according to the embodiment of the present invention and the conventional scheme. The simulation was performed based on an OFDM system, 256 subcarrier waves were used, and a length of a protection section is 64. Quadrature phase shift keying (QPSK) was used as a modulation method, and the channel was implemented by using a Rayleigh fading channel with seven multipaths. At this time, it is assumed that a channel estimation is perfect.

FIG. 10 illustrates BER versus SNR graphs of a conventional system and a proposed system in a system model according to the present invention. As illustrated in FIG. 10, it can be seen that a bit error rate sequentially decreases from the conventional scheme of FIG. 5 to the first to fourth proposed schemes according to the present invention of FIG. 6. The conventional scheme does not have good BER performance because an interference degrades performance of the mobile terminal. The first proposed method reduced an error rate by applying the CoMP scheme to a signal. It can be seen that the BER performance of the terminal is improved as in the second proposed method by constructively pre-coding a cooperative signal and the desired signal and destructively pre-coding the interference signal. If the MIMO detection scheme is applied and furthermore the pre-coding is applied thereto, influence of the interference can be minimized. As described above, the scheme proposed by the present invention can improve the reliability of the mobile terminal by effectively mitigating the interference as compared with the conventional scheme.

FIG. 11 is a diagram illustrating throughputs of the conventional scheme and the scheme proposed by the present invention using SNR versus BER graphs. It can be seen that the throughput is sequentially increased from the conventional scheme to the first to fourth proposed schemes according to the present invention, and at this time, the throughput is calculated as follows.

$$T=(1-BER) \times N_t \quad \text{[Equation 15]}$$

In Equation 15, T denotes the throughput and $N_b$ denotes the number of transmitted information bits. The BER is a value obtained through the simulation in FIG. 10. The conventional scheme has a poor interference, thereby, having a poor throughput. The first and second propose schemes do not use a detection scheme, and thereby, noise due to the interference is amplified during a signal compensation, and thus, a throughput thereof is not so good. Since the third and fourth proposed schemes use the detection scheme, the noise is prevented from being amplified, and thus, it can be seen that the throughput is greatly increased. Since the finally proposed scheme has a throughput which converges to approximately 1, it is possible to sufficiently satisfy QoS of a user when the mobile terminal is located at an outer edge of the cell.

FIG. 12 is a diagram illustrating BER versus SNR performance according to the number of bits of the pre-coding scheme.

In order to compare the performance of the pre-coding scheme, simulation was performed with two transmission antennas, one reception antenna, and a MISO-OFDM signal to which no pre-coding scheme is applied. The pre-coded signals have one bit, two bits, and full bits, respectively, and the constructive SPC was used therefor. As can be seen from the graphs, the pre-coded signals have much lower bit error rates than the non-pre-coded signal. At this time, the bit error rates are reduced in an ascending order from the 1-bit SPC to the full-bit SPC (MRT), and performance is best when the MRT is used. However, the 1-bit SPC and the 2-bit SPC have similar performances to the MRT. That is, performance similar to performance of the MRT can be achieved with only 1-bit and 2-bit feedback information. Therefore, the pre-coding vector of the scheme proposed by the present invention uses a 2-bit pre-coding vector having the performance similar to the performance of the MRT and a very low implementation complexity.

FIG. 13 are graphs illustrating a result of simulation for the BER versus SNR performance of the ZF scheme and the MMSE scheme, based on the third and fourth proposed methods. At this time, it can be seen that the MMSE scheme has a lower bit error rate than the ZF scheme by preventing noise from being amplified.

FIG. 14 illustrates graphs of BER versus SNR performance due to a path attenuation due to an increase in distance between the mobile terminal and a base station of an interference signal in the second proposed scheme of the present invention. As the distance between the mobile terminal and a peripheral base station increases, a path loss increases and influence of an interference on the mobile terminal decreases, and thereby, a bit error rate is reduced. As the simulation result, the graph represents the BER performance when the distance is 2d, 4d, 8d, and 16d if the distance between the mobile terminal and the adjacent base station is referred to as d. At this time, the path loss only considers attenuation of a signal due to an increase in distance in an ideal free space, and the received signal power $P_R(d)$ according to a distance d can be calculated as follows.

$$P_R(d) = P_T k \left(\frac{\lambda_c}{4\pi d}\right)^2 \quad \text{[Equation 16]}$$

In Equation 16, d denotes a distance between an adjacent base station and a mobile terminal, and $\lambda_c$ denotes a wavelength of an interference signal. $P_T$ denotes a transmission power and k denotes a proportional constant. $(*)^2$ is a path loss index and the exponent is fixed as 2 in a free space. At this time, if the distance is very far and the influence of the interference signal is substantially eliminated, only the constructively pre-coded signal is left, and the BER performance is improved.

As a result, as the interference mitigation scheme proposed by the present invention is compared with the conventional scheme, the CoMP scheme, the pre-coding scheme, and the MIMO detection scheme are applied step by step to effectively mitigate an intercellular interference of the mobile terminal to satisfy QoS of a user, and thus, it is possible to increase reliability of the mobile terminal.

While the present invention is described with reference to embodiments illustrated in the drawings, the invention is a merely exemplary example and it will be understood by those skilled in the art that various modifications and equivalent embodiments are possible. Accordingly, the true scope of the present invention should be determined by the technical idea of the appended claims.

The invention claimed is:

1. An intercellular cooperative communication method using a MIMO-OFDM-based cooperative communication system in a heterogeneous network including a macro cell and a small cell having two antennas, the method comprising:
    a step of grasping a location of a mobile terminal and a phase relationship between channels by receiving a channel state with a macro base station and a channel state with a second small base station from the mobile terminal using a first small base station in a first small cell;
    a step of transmitting a first signal in cooperation with the macro base station if the mobile terminal is located at a boundary between the first small cell and the second small cell;
    a step of receiving signals through first and second antennas using the mobile terminal, receiving the first signal from the two antennas of the first small base station and the two antennas of the macro base station, and receiving a second signal from the two antennas of the second small base station; and
    a step of detecting the first signal from a signal vector which is received by the first and second antennas,
    wherein a received signal $Y_i$ of an i-th antenna of the mobile terminal is defined by a following equation $$Y_1 = \underbrace{(H_{11} + H_{12} + H_{13} + H_{14})}_{a1} X_1 + \underbrace{(H_{15} + H_{16})}_{b1} X_2 + N_1$$

-continued
$$Y_2 = \underbrace{(H_{21} + H_{22} + H_{23} + H_{24})}_{c1} X_1 + \underbrace{(H_{25} + H_{26})}_{d1} X_2 + N_2$$

where $H_{i1}$ and $H_{i2}$ denote channels between the i-th antenna and the two antennas of the first small base station, $H_{i3}$ and $H_{i4}$ denotes channels between the i-th antenna and the two antennas of the macro base station, $H_{i5}$ and $H_{i6}$ denotes channels between the i-th antenna and the two antennas of the second small base station, $X_1$ denotes the first signal, $X_2$ denotes the second signal, and $N_i$ denotes noise of the i-th antenna.

2. The intercellular cooperative communication method of claim 1, further comprising:
    a step of generating constructive feedback information for increasing a magnitude of the first signal and destructive feedback information for reducing a magnitude of the second signal, based on a phase relationship between the channels; and
    a step of sharing the constructive feedback information and the destructive feedback information with the macro base station and the second small base station, respectively,
    wherein the step of receiving the first and second signals using the mobile terminal includes receiving the first signal that is obtained by reflecting a pre-coding vector corresponding to the constructive feedback information on each channel with the first small base station and each channel with the macro base station, and receiving the second signal which is obtained by reflecting a pre-coding vector corresponding to the destructive feedback information on each channel with the second small base station.

3. The intercellular cooperative communication method of claim 2,
    wherein the step of generating the feedback information includes generating the constructive feedback information for increasing a composite channel by $H_{i1}$, $H_{i2}$, $H_{i3}$, and $H_{i4}$ based on a phase difference between the channels $H_{i1}$, $H_{i2}$, $H_{i3}$, and $H_{i4}$, and generating the destructive feedback information for reducing a composite channel by $H_{i5}$ and $H_{i6}$ based on a phase difference between the channels $H_{i5}$ and $H_{i6}$, and
    wherein $H_{i1}$ and $H_{i2}$ denote channels between the i-th antenna and the two antennas of the first small base station, $H_{i3}$ and $H_{i4}$ denotes channels between the i-th antenna and the two antennas of the macro base station, and $H_{i5}$ and $H_{i6}$ denotes channels between the i-th antenna and the two antennas of the second small base station.

4. The intercellular cooperative communication method of claim 3,
    wherein a received signal $Y_i$ of an i-th antenna of the mobile terminal is defined by a following equation $$Y_1 = \underbrace{(P_5(P_3(P_1 H_{11} + P_2 H_{12}) + P_4 H_{13}) + P_6 H_{14})}_{a2} X_1 +$$
$$\underbrace{(P_7 H_{15} + P_8 H_{16})}_{b2} X_2 + N_1$$

$$Y_2 = \underbrace{P_{13}(P_{11}(P_9 H_{21} + P_{10} H_{22}) + P_{12} H_{23}) + P_{14} H_{24})}_{c2} X_1 +$$
$$\underbrace{(P_{15} H_{25} + P_{16} H_{26})}_{d2} X_2 + N_2$$

where $P_1$ to $P_6$ and $P_9$ to $P_{14}$ denote a plurality of pre-coding vectors which is reflected in $H_{i1}$ to $H_{i4}$ according to the constructive feedback information, $P_7$, $P_8$, $P_{15}$, and $P_{16}$ denote a plurality of pre-coding vectors which is reflected in $H_{15}$ and $H_{16}$ according to the destructive feedback information, $X_1$ denote the first signal, $X_2$ denote the second signal, and $N_i$ denote noise of the i-th antenna.

5. The intercellular cooperative communication method of claim 2,
   wherein the constructive feedback information and the destructive feedback information are each a 2-bit signal, and include information for requesting to maintain a phase of one of the two channels while maintaining a phase of the other channel or rotating by 90 degrees or by 180 degrees, based on an angular section to which a phase difference between the two channels belongs, and
   wherein the two channels mean a single channel versus a single channel or a composite channel in which a plurality of channels are combined versus a single channel.

6. The intercellular cooperative communication method of claim 5,
   wherein a pre-coding vector $P^c$ corresponding to the constructive feedback information and a pre-coding vector $P^d$ corresponding to the destructive feedback information are defined by following equations $$P_2^c = \begin{cases} 1, & |\alpha^k| \le \pi/4 & \text{(State1)} \\ e^{-j\pi}, & 3\pi/4 < \alpha^k \le 5\pi/4 & \text{(State2)} \\ e^{-j\frac{\pi}{2}}, & \pi/4 < \alpha^k \le 3\pi/4 & \text{(State3)} \\ e^{j\frac{\pi}{2}}, & 5\pi/4 < \alpha^k \le 7\pi/4 & \text{(State4)} \end{cases} \text{ and}$$

$$P_2^d = \begin{cases} e^{-j\pi}, & |\alpha^k| \le \pi/4 & \text{(State1)} \\ 1, & 3\pi/4 < \alpha^k \le 5\pi/4 & \text{(State2)} \\ e^{j\frac{\pi}{2}}, & \pi/4 < \alpha^k \le 3\pi/4 & \text{(State3)} \\ e^{-j\frac{\pi}{2}}, & 5\pi/4 < \alpha^k \le 7\pi/4 & \text{(State4)} \end{cases}$$

where $\alpha$ means a phase difference.

7. The intercellular cooperative communication method of claim 1,
   wherein the step of detecting the first signal includes detecting the first signal from the received signal vector using an MMSE detection scheme.

8. A MIMO-OFDM-based intercellular cooperative communication system including a macro base station having two antennas and first and second small base stations in first and second small cells,
   wherein the first small base station includes
      a reception unit that receives a channel state with the macro base station and a channel state with the second small base station from a mobile terminal;
      an analysis unit that grasps a location of the mobile terminal and a phase relationship between channels; and
      a transmission unit that transmits a first signal in cooperation with the macro base station if the mobile terminal is located at a boundary between the first small cell and the second small cell, and
   wherein the mobile terminal receives signals through first and second antennas of the mobile terminal, receives the first signal from the two antennas of the first small base station and the two antennas of the macro base station, receives a second signal from the two antennas of the second small base station, and detects the first signal from a signal vector which is received by the first and second antennas,
   wherein a received signal $Y_i$ of an i-th antenna of the mobile terminal is defined by a following equation $$Y_1 = \underbrace{(H_{11} + H_{12} + H_{13} + H_{14})}_{a1}X_1 + \underbrace{(H_{15} + H_{16})}_{b1}X_2 + N_1$$

$$Y_2 = \underbrace{(H_{21} + H_{22} + H_{23} + H_{24})}_{c1}X_1 + \underbrace{(H_{25} + H_{26})}_{d1}X_2 + N_2$$

where $H_{i1}$ and $H_{i2}$ denote channels between the i-th antenna and the two antennas of the first small base station, $H_{i3}$ and $H_{i4}$ denotes channels between the i-th antenna and the two antennas of the macro base station, $H_{i5}$ and $H_{i6}$ denotes channels between the i-th antenna and the two antennas of the second small base station, $X_1$ denotes the first signal, $X_2$ denotes the second signal, and $N_i$ denotes noise of the i-th antenna.

9. The intercellular cooperative communication system of claim 8,
   wherein the first small base station further includes a generation unit that generates constructive feedback information for increasing a magnitude of the first signal and destructive feedback information for reducing a magnitude of the second signal, based on a phase relationship between the channels,
   wherein the transmission unit shares the constructive feedback information and the destructive feedback information with the macro base station and the second small base station, respectively, and
   wherein the mobile terminal receives the first signal that is obtained by reflecting a pre-coding vector corresponding to the constructive feedback information on each channel with the first small base station and each channel with the macro base station, and receives the second signal which is obtained by reflecting a pre-coding vector corresponding to the destructive feedback information on each channel with the second small base station.

10. The intercellular cooperative communication system of claim 9,
    wherein the generation unit generates the constructive feedback information for increasing a composite channel by $H_{i1}$, $H_{i2}$, $H_{i3}$, and $H_{i4}$ based on a phase difference between the channels $H_{i1}$, $H_{i2}$, $H_{i3}$, and $H_{i4}$, and generates the destructive feedback information for reducing a composite channel by $H_{i5}$ and $H_{i6}$ based on a phase difference between the channels $H_{i5}$ and $H_{i6}$, and
    wherein $H_{i1}$ and $H_{i2}$ denote channels between the i-th antenna and the two antennas of the first small base station, $H_{i3}$ and $H_{i4}$ denotes channels between the i-th antenna and the two antennas of the macro base station, and $H_{i5}$ and $H_{i6}$ denotes channels between the i-th antenna and the two antennas of the second small base station.

11. The intercellular cooperative communication system of claim 10,
    wherein a received signal $Y_i$ of an i-th antenna of the mobile terminal is defined by a following equation $$Y_1 = \underbrace{(P_5(P_3(P_1H_{11} + P_2H_{12}) + P_4H_{13}) + P_6H_{14})}_{a2}X_1 +$$

$$\underbrace{(P_7H_{15} + P_8H_{16})}_{b2}X_2 + N_1$$

$$Y_2 = \underbrace{P_{13}(P_{11}(P_9H_{21} + P_{10}H_{22}) + P_{12}H_{23}) + P_{14}H_{24})}_{c2}X_1 +$$

$$\underbrace{(P_{15}H_{25} + P_{16}H_{26})}_{d2}X_2 + N_2$$

where $P_1$ to $P_6$ and $P_9$ to $P_{14}$ denote a plurality of pre-coding vectors which is reflected in $H_{11}$ to $H_{14}$ according to the constructive feedback information, $P_7$, $P_8$, $P_{15}$, and $P_{16}$ denote a plurality of pre-coding vectors which is reflected in $H_{i5}$ and $H_{i6}$ according to the destructive feedback information, $X_1$ denote the first signal, $X_2$ denote the second signal, and $N_i$ denote noise of the i-th antenna.

12. The intercellular cooperative communication system of claim 9,
wherein the constructive feedback information and the destructive feedback information each are each a 2-bit signal, and include information for requesting to maintain a phase of one of the two channels while maintaining a phase of the other channel or rotating by 90 degrees or by 180 degrees, based on an angular section to which a phase difference between the two channels belongs, and
wherein the two channels mean a single channel versus a single channel or a composite channel in which a plurality of channels are combined versus a single channel.

13. The intercellular cooperative communication system of claim 12,
wherein a pre-coding vector $P^c$ corresponding to the constructive feedback information and a pre-coding vector $P^d$ corresponding to the destructive feedback information are defined by following equations $$P_2^c = \begin{cases} 1, & |\alpha^k| \leq \pi/4 & \text{(State1)} \\ e^{-j\pi}, & 3\pi/4 < \alpha^k \leq 5\pi/4 & \text{(State2)} \\ e^{-j\frac{\pi}{2}}, & \pi/4 < \alpha^k \leq 3\pi/4 & \text{(State3)} \\ e^{j\frac{\pi}{2}}, & 5\pi/4 < \alpha^k \leq 7\pi/4 & \text{(State4)} \end{cases} \text{ and}$$

$$P_2^d = \begin{cases} e^{-j\pi}, & |\alpha^k| \leq \pi/4 & \text{(State1)} \\ 1, & 3\pi/4 < \alpha^k \leq 5\pi/4 & \text{(State2)} \\ e^{j\frac{\pi}{2}}, & \pi/4 < \alpha^k \leq 3\pi/4 & \text{(State3)} \\ e^{-j\frac{\pi}{2}}, & 5\pi/4 < \alpha^k \leq 7\pi/4 & \text{(State4)} \end{cases}$$

where $\alpha$ means a phase difference.

14. The intercellular cooperative communication system of claim 8,
wherein the mobile terminal detects the first signal from the received signal vector using an MME detection scheme.

\* \* \* \* \*